United States Patent [19]
Toriu et al.

[11] Patent Number: 5,214,504
[45] Date of Patent: May 25, 1993

[54] MOVING VIDEO IMAGE ESTIMATION SYSTEM

[75] Inventors: Takashi Toriu, Kawasaki; Satoshi Naoi, Yokohama, both of Japan

[73] Assignee: Fujitsu Limited, Kawasaki, Japan

[21] Appl. No.: 648,986

[22] Filed: Jan. 31, 1991

[30] Foreign Application Priority Data

Jan. 31, 1990 [JP] Japan .................................. 2-20599

[51] Int. Cl.$^5$ ........................................... H04N 5/262
[52] U.S. Cl. .................................. 358/105; 358/136
[58] Field of Search ................................ 358/105, 136

[56] References Cited

U.S. PATENT DOCUMENTS 4,855,822 8/1989 Narendra ........................... 358/105

Primary Examiner—Howard W. Britton
Attorney, Agent, or Firm—Staas & Halsey

[57] ABSTRACT

A moving video image estimation system wherein based on an original video image of time n and time n+1, the centroid, the principal axix of inertia, the moment about the principal axis of inertia and the moment about the axis perpendicular to the principal axis of inertia are obtained. By using this information, an affine transformation for transforming the original video image at time n to the original video image at time n+1 is obtained. Based on the infinitesimal transformation (A), {exp (At), and exp (A(t−1))} obtained by making the affine transformation continuous with regard to time is executed on the original video image at time n and time n+1. The results are synthesized to perform an interpolation between the frames. {exp (a(t−1))} is applied to the original video system time n+1. The video image after time n+1 is thereby protected.

15 Claims, 16 Drawing Sheets

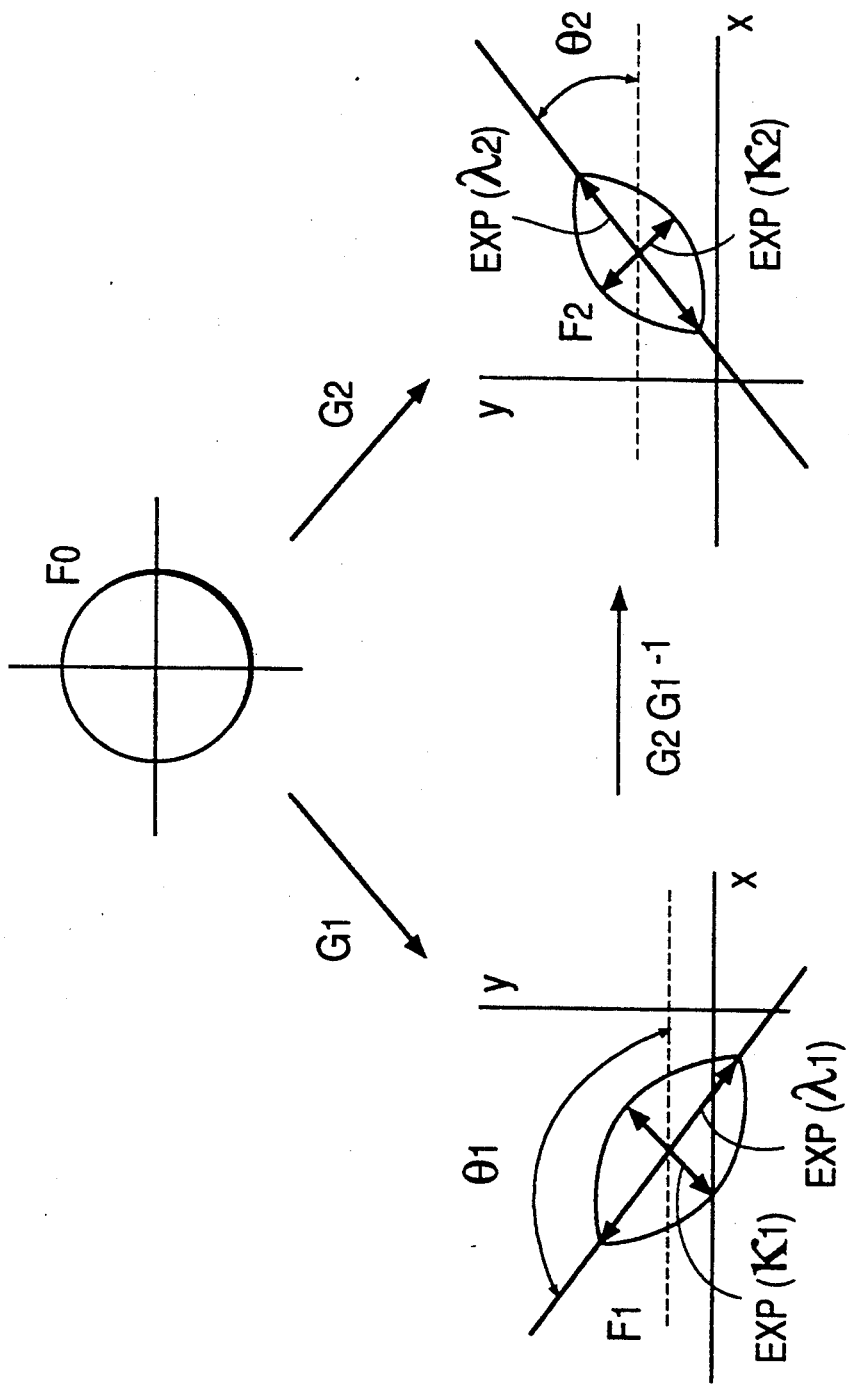

FIG. 8

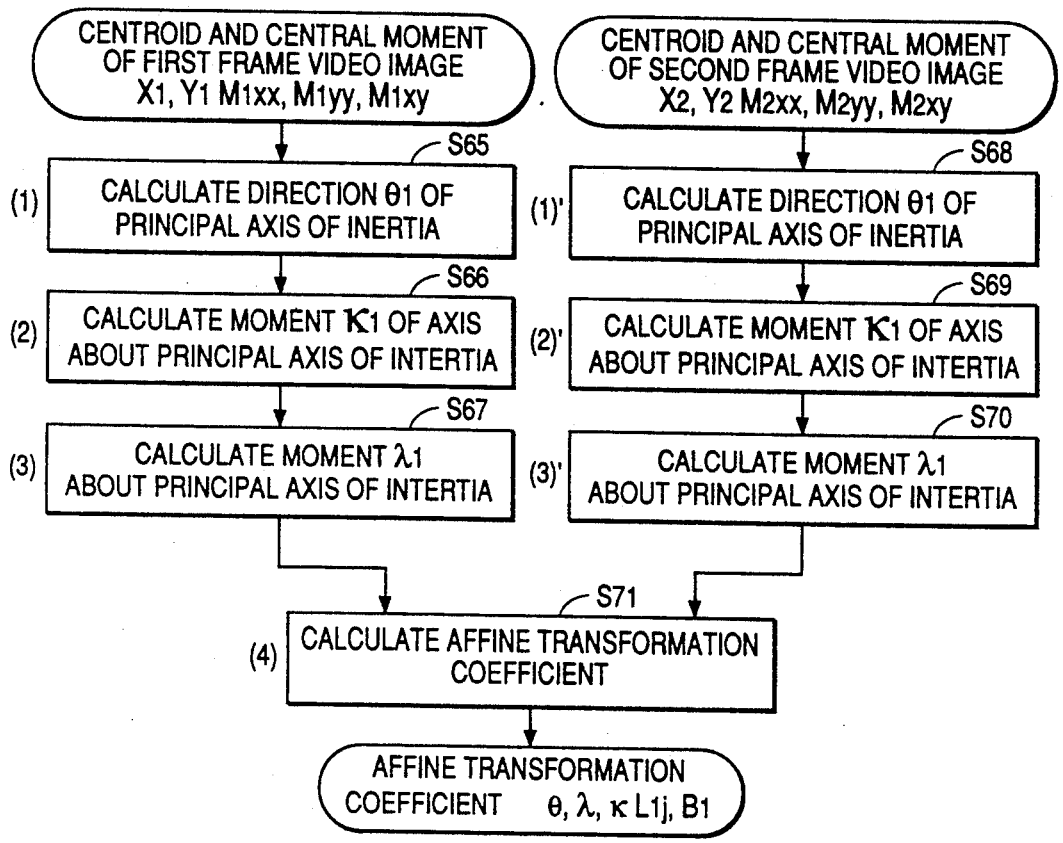

(1) $\tan(2\theta_1) = 2M_{1xy} / (M_{1xx} - M_{1yy})$
(1)' $\tan(2\theta_2) = 2M_{2xy} / (M_{2xx} - M_{2yy})$
(2) $\exp(2\kappa_1) = [M_{1xx} + M_{1yy} + \sqrt{((M_{1xx} - M_{1yy})^2 + 4M_{1xy}^2)}] / 2$
(2)' $\exp(2\kappa_2) = [M_{2xx} + M_{2yy} + \sqrt{((M_{2xx} - M_{2yy})^2 + 4M_{2xy}^2)}] / 2$
(3) $\exp(2\lambda_1) = [M_{1xx} + M_{1yy} - \sqrt{((M_{1xx} - M_{1yy})^2 + 4M_{1xy}^2)}] / 2$
(3)' $\exp(2\lambda_2) = [M_{2xx} + M_{2yy} - \sqrt{((M_{2xx} - M_{2yy})^2 + 4M_{2xy}^2)}] / 2$
(4) $\theta = \theta_2 - \theta_1$
$\lambda = (\kappa_2 - \kappa_1 + \lambda_2 - \lambda_1) / 2$
$\kappa = (\kappa_2 - \kappa_1 - \lambda_2 + \lambda_1) / 2$ $$\begin{bmatrix} x' \\ y' \end{bmatrix} = \begin{bmatrix} L_{11} & L_{12} \\ L_{21} & L_{22} \end{bmatrix} \begin{bmatrix} x \\ y \end{bmatrix} + \begin{bmatrix} B_1 \\ B_1 \end{bmatrix}$$

$H_{11} = \exp\lambda \exp\kappa \cos\theta$
$H_{12} = -\exp\lambda \exp(-\kappa) \sin\theta$
$H_{21} = \exp\lambda \exp\kappa \sin\theta$
$H_{22} = -\exp\lambda \exp(-\kappa) \cos\theta$
$L_{11} = \cos^2\theta_1 H_{11} + \sin\theta_1 \cos\theta_1 (H_{12}+H_{21}) + \sin^2\theta_1 H_{22}$
$L_{12} = \cos^2\theta_1 H_{12} + \sin\theta_1 \cos\theta_1 (H_{22}-H_{11}) - \sin^2\theta_1 H_{21}$
$L_{21} = \cos^2\theta_1 H_{21} + \sin\theta_1 \cos\theta_1 (H_{22}-H_{11}) - \sin^2\theta_1 H_{12}$
$L_{22} = \cos^2\theta_1 H_{22} - \sin\theta_1 \cos\theta_1 (H_{12}+H_{21}) + \sin^2\theta_1 H_{11}$
$B_1 = L_{11}X_1 + L_{12}Y_1 + X_2$
$B_2 = L_{21}X_1 + L_{22}Y_1 + Y_2$

FIG. 9

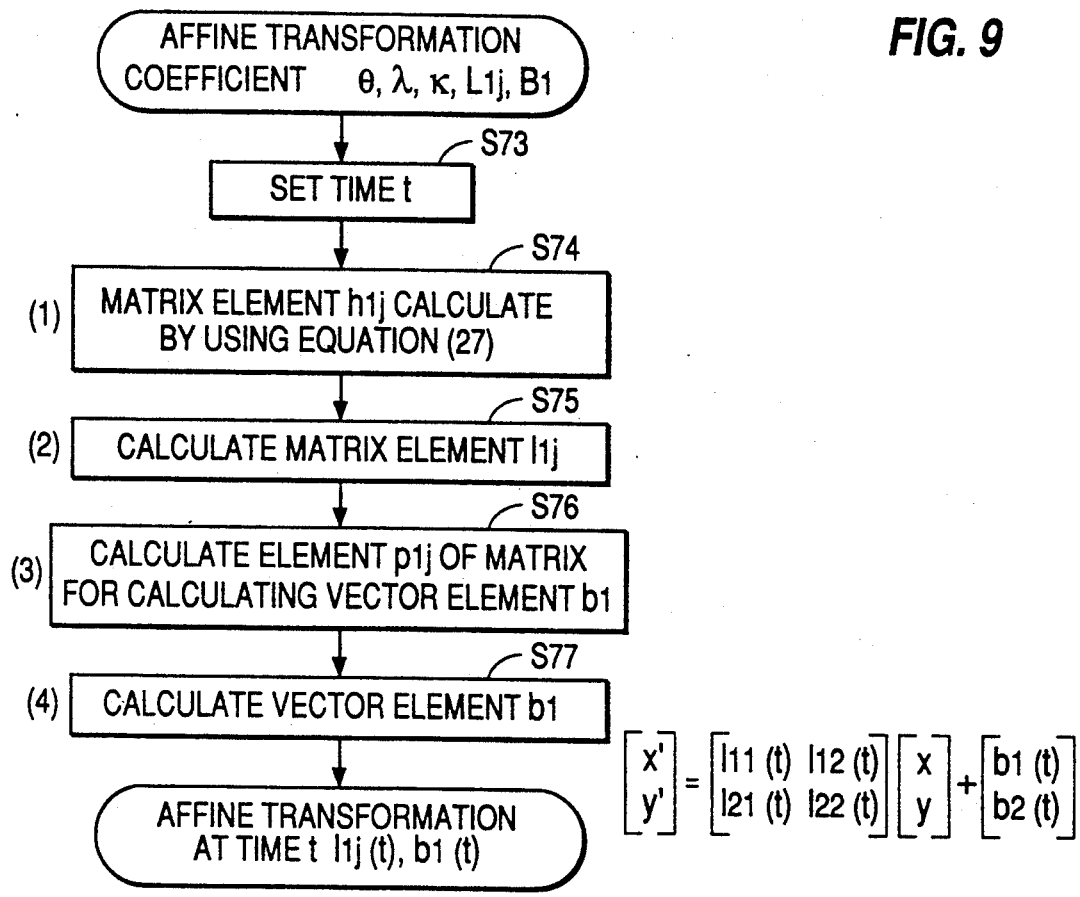

```
AFFINE TRANSFORMATION
COEFFICIENT   θ, λ, κ, L1j, B1
        │
        ▼                    ┌─ S73
   ┌─────────────┐
   │  SET TIME t │
   └─────────────┘
        │
        ▼                    ┌─ S74
   ┌──────────────────────────────┐
(1)│ MATRIX ELEMENT h1j CALCULATE │
   │   BY USING EQUATION (27)     │
   └──────────────────────────────┘
        │
        ▼                    ┌─ S75
   ┌──────────────────────────────┐
(2)│  CALCULATE MATRIX ELEMENT l1j│
   └──────────────────────────────┘
        │
        ▼                    ┌─ S76
   ┌──────────────────────────────────┐
(3)│ CALCULATE ELEMENT p1j OF MATRIX  │
   │ FOR CALCULATING VECTOR ELEMENT b1│
   └──────────────────────────────────┘
        │
        ▼                    ┌─ S77
   ┌──────────────────────────────┐
(4)│  CALCULATE VECTOR ELEMENT b1 │
   └──────────────────────────────┘
        │
        ▼
 AFFINE TRANSFORMATION
  AT TIME t  l1j(t), b1(t)
```

$$\begin{bmatrix} x' \\ y' \end{bmatrix} = \begin{bmatrix} l11(t) & l12(t) \\ l21(t) & l22(t) \end{bmatrix} \begin{bmatrix} x \\ y \end{bmatrix} + \begin{bmatrix} b1(t) \\ b2(t) \end{bmatrix}$$

(1) $\cos\phi = \cos h\,\kappa\,\cos\theta$
  $h11 = \exp\lambda t\,(\exp\kappa\,\cos\theta\,\sin\phi\,t - \sin(t-1)\phi)/\sin\phi$
  $h12 = \exp\lambda t\,(-\exp(-\kappa)\,\sin\theta\,\sin\phi\,t)/\sin\phi$
  $h21 = \exp\lambda t\,(\exp\kappa\,\sin\theta\,\sin\phi\,t)/\sin\phi$
  $h22 = \exp\lambda t\,(-\exp(-\kappa)\,\cos\theta\,\sin\phi\,t - \sin(t-1)\phi)/\sin\phi$ (2) $l11 = \cos^2\theta_1\,h11 + \sin\theta_1\cos\theta_1\,(h12+h21) + \sin^2\theta_1\,h22$
  $l12 = \cos^2\theta_1\,h12 + \sin\theta_1\cos\theta_1\,(h22-h11) - \sin^2\theta_1\,h21$
  $l21 = \cos^2\theta_1\,h21 + \sin\theta_1\cos\theta_1\,(h22-h11) - \sin^2\theta_1\,h12$
  $l22 = \cos^2\theta_1\,h22 - \sin\theta_1\cos\theta_1\,(h12+h21) + \sin^2\theta_1\,h11$ (3) $q11 = (l11 L22 - L21\,l12)/(L11 L22 - L21 L12)$
  $q12 = (l12 L22 - L22\,l12)/(L11 L22 - L21 L12)$
  $q12 = (l21 L11 - L11\,l21)/(L11 L22 - L21 L12)$
  $q11 = (l22 L12 - L12\,l21)/(L11 L22 - L21 L12)$ $p11 = \cos^2\theta_1\,q11 + \sin\theta_1\cos\theta_1\,(q12+q21) + \sin^2\theta_1\,q22$
  $p12 = \cos^2\theta_1\,q12 + \sin\theta_1\cos\theta_1\,(q22-q11) - \sin^2\theta_1\,q21$
  $p21 = \cos^2\theta_1\,q21 + \sin\theta_1\cos\theta_1\,(q22-q11) - \sin^2\theta_1\,q12$
  $p22 = \cos^2\theta_1\,q22 - \sin\theta_1\cos\theta_1\,(q12+q21) + \sin^2\theta_1\,q11$ (4) $b1 = -(p11\,B1 + p12\,B2)$
  $b2 = -(p21\,B1 + p22\,B2)$

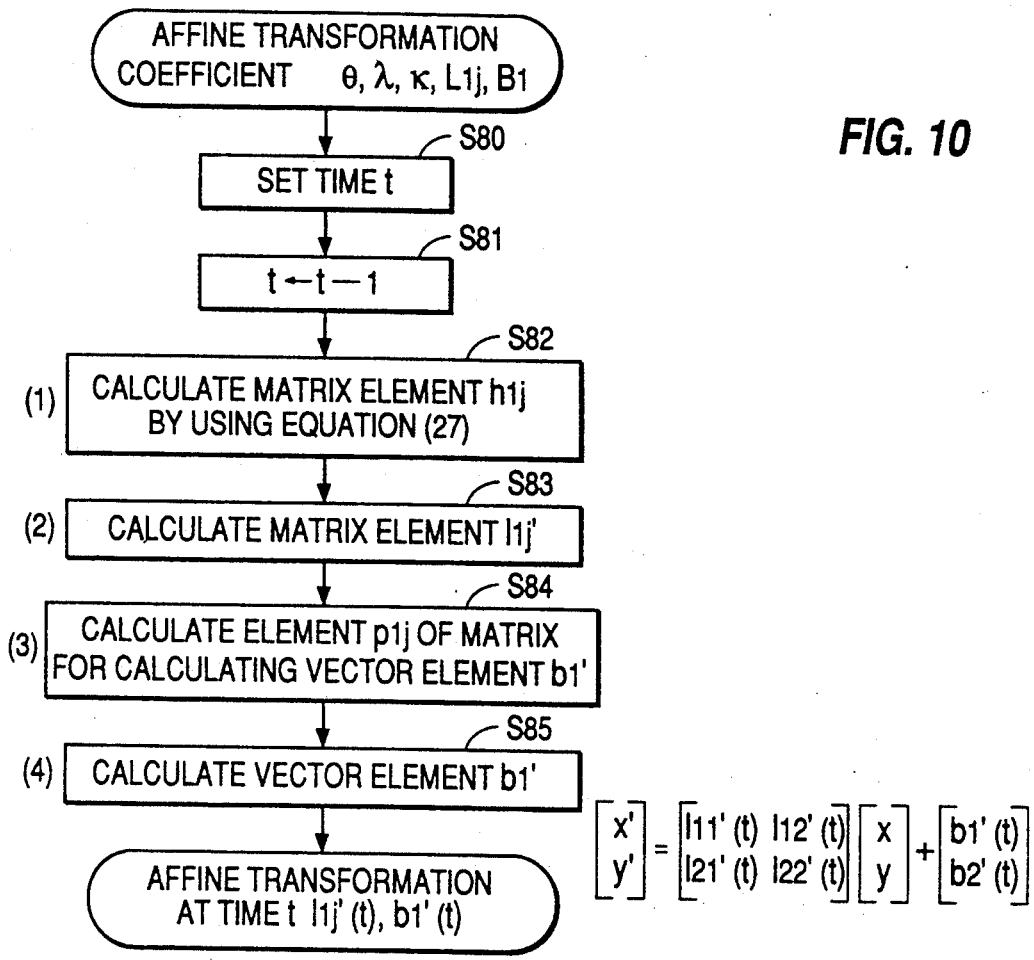

FIG. 10

(1) $\cos\phi = \cos h\,\kappa\,\cos\theta$
$h11 = \exp\lambda t\,(\exp\kappa\,\cos\theta\,\sin\phi\,t - \sin(t-1)\,\phi)/\sin\phi$
$h12 = \exp\lambda t\,(-\exp(-\kappa)\,\sin\theta\,\sin\phi\,t)/\sin\phi$
$h21 = \exp\lambda t\,(\exp\kappa\,\sin\theta\,\sin\phi\,t)/\sin\phi$
$h22 = \exp\lambda t\,(-\exp(-\kappa)\,\cos\theta\,\sin\phi\,t - \sin(t-1)\,\phi)/\sin\phi$ (2) $l11' = \cos^2\theta1\,h11 + \sin\theta1\,\cos\theta1\,(h12+h21) + \sin^2\theta1\,h22$
$l12' = \cos^2\theta1\,h12 + \sin\theta1\,\cos\theta1\,(h22-h11) - \sin^2\theta1\,h21$
$l21' = \cos^2\theta1\,h21 + \sin\theta1\,\cos\theta1\,(h22-h11) - \sin^2\theta1\,h12$
$l22' = \cos^2\theta1\,h22 - \sin\theta1\,\cos\theta1\,(h12+h21) + \sin^2\theta1\,h11$ (3) $q11 = (l11'\,L22 - L21\,l12')/(L11\,L22 - L21\,L12)$
$q12 = (l12'\,L22 - L22\,l12')/(L11\,L22 - L21\,L12)$
$q12 = (l21'\,L11 - L11\,l21')/(L11\,L22 - L21\,L12)$
$q11 = (l22'\,L12 - L12\,l21')/(L11\,L22 - L21\,L12)$ $p11 = \cos^2\theta1\,q11 + \sin\theta1\,\cos\theta1\,(q12+q21) + \sin^2\theta1\,q22$
$p12 = \cos^2\theta1\,q12 + \sin\theta1\,\cos\theta1\,(q22-q11) - \sin^2\theta1\,q21$
$p21 = \cos^2\theta1\,q21 + \sin\theta1\,\cos\theta1\,(q22-q11) - \sin^2\theta1\,q12$
$p22 = \cos^2\theta1\,q22 - \sin\theta1\,\cos\theta1\,(q12+q21) + \sin^2\theta1\,q11$ (4) $b1' = -(p11\,B1 + p12\,B2)$
$b2' = -(p21\,B1 + p22\,B2)$

MOVING VIDEO IMAGE ESTIMATION SYSTEM

BACKGROUND OF THE INVENTION

1. Field of the Invention

The present invention generally relates to estimation systems for interpolating moving pictures between frames and, more particularly, to a system for generating a video image occurring at an arbitrary time t between video images provided at times n and n+1 and at an arbitrary time t after time n+1 for a time series of video images provided at discrete times 1, 2, ... n, n+1, ...

2. Description of the Related Art

In currently available television systems for mass media broadcasts, video images are output every one-thirtieth of a second to accurately express a moving picture. If, for example, only ten video images are output per second, a moving picture becomes hard to watch.

In the field of so-called animation, a number of slightly different video images are formed and output at the rate of 30 images per second, thereby obtaining a smooth moving picture. This causes the problem that a vast number of processes are required to form these images manually. However, if some intermediate images are omitted and these omitted images are then interpolated to form a moving picture, the number of processes can be considerably reduced.

Further, in the medical field, a user of an ultrasonic diagnostic machine may want to obtain continuous ultrasonic video images of, for example, a cardiac blood stream flow. However, in the present technology, there is the problem that only 30 continuous video images can be obtained per second.

Under such circumstances, an interframe interpolation system for effectively obtaining a video image at an arbitrary time t between times n and n+1 and at an arbitrary time t after time n+1 on the basis of video images given at discrete times n and n+1 is needed.

FIGS. 1A and 1B are schematic diagrams used to explain a conventional moving video image estimation system. FIG. 1A shows examples of time series video images at time n and time n+1, and FIG. 1B shows problems encountered with existing interframe interpolation systems.

When a video image at an arbitrary time t between time n and time n+1 is produced for time series video images given at discrete times 1, 2, ... n, n+1, ... {see FIG. 1A}. According to the prior-art real moving picture interpolation system, concentrations at every pixel of the video image at time n and the video image at time n+1 are interpolated linearly.

More specifically, when the video image at time n is expressed as I(x,y;n) and the video image at time n+1 is expressed as I(x,y;n+1), a video image J(x,y;t) to be produced at an intermediate time t between times n and n+1 is calculated from the following equation.

$$J(x,y;t) = (n+1-t)I(x,y;n) + (t-n)I(x,y;n+1)$$

In accordance with this conventional system, when the position and shape of an object in a video image are considerably changed between the frames, there is then the disadvantage that the video image of the object in the original frame will be doubly reproduced in the interpolated video image.

SUMMARY OF THE INVENTION

Accordingly, it is an object of the present invention to provide an improved moving video image estimation system which can eliminate the aforenoted shortcomings and disadvantages encountered with the conventional moving video image estimation system.

More specifically, it is an object of the present invention to provide a moving video image estimation system which performs an estimation of a real moving picture.

It is another object of the present invention to provide a moving video image estimation system in which, when a video image of an arbitrary time t between time n and time n+1 is produced for time series video images given at discrete times 1, 2, ... n, n+1, ..., even if the position and shape of an object in the video image are considerably changed between the frames, the video image of the object in the original frame is not doubly reproduced in the interpolated video image.

According to a first aspect of the present invention, a moving video image estimation system is comprised of moment calculating means for calculating primary and secondary moments of a video image; affine transformation calculating means utilizing an output of the moment calculating means to determine affine transformation (G) by which a first-frame video image ($I_1$) is geometrically transformed into a second-frame video image ($I_2$); affine transformation continuing means for multiplying by a constant (t) an infinitesimal transformation (A) expressed by the relation G=exp ( A), where G is the affine transformation, and for obtaining an exponential transformation {exp(At)} as a continuing affine transformation; and affine transformation executing means for executing the continued affine transformation {exp(At)} to the first-frame video image ($I_1$) to thereby obtain a video image at a time after an arbitrary time (t) from a time corresponding to the first-frame video image.

In accordance with a second aspect of the present invention, a moving video image estimation system is comprised of moment calculating means for calculating primary and secondary moments of a video image; affine transformation calculating means utilizing an output of the moment calculating means to determine affine transformation (G) by which a first frame video image ($I_1$) is geometrically transformed into a second frame video image ($I_2$); first affine transformation continuing means for multiplying by a constant (t) an infinitesimal transformation (A), expressed by the relation of G=exp (A), where G is the affine transformation, and for obtaining an exponential transformation {exp(At)}; second affine transformation continuing means for multiplying the infinitesimal transformation (A) by another constant (t−1) and obtaining an exponential transformation {exp(A (t−1))}; and affine transformation executing means for obtaining a video image at an arbitrary time (t) between the first and second frames as a linear sum of a result provided by executing a transformation {exp(At))}, provided as an output of the first affine transformation continuing means, onto the first frame video image ($I_1$) and of a result provided by executing a transformation {exp(A (t−1)),}, provided as an output of the second affine transformation continuing means, onto the second frame video image ($I_2$).

The above, and other objects, features and advantages of the present invention will become apparent in the following detailed description of illustrative embodiments to be read in conjunction with the accompa-

BRIEF DESCRIPTION OF THE DRAWINGS

FIG. 3A is a schematic diagram used to explain the affine transformation of the present invention and FIG. 3B is a flowchart used to explain how to estimate a video image, FIG. 8 is a flowchart used to explain a processing for determining affine transformation, FIG. 9 is a flowchart used to explain a first affine transformation continuing process, FIG. 10 is a flowchart used to explain a second affine transformation continuing process.

DETAILED DESCRIPTION OF THE PREFERRED EMBODIMENTS

Figure 1A:
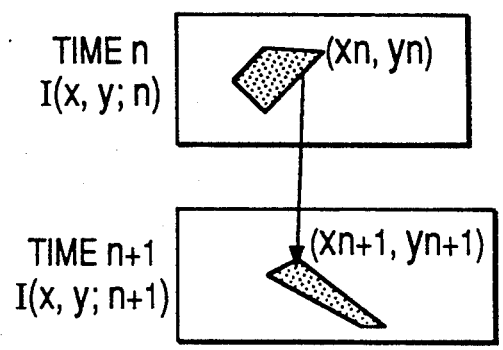
FIGS. 1A and 1B are schematic diagrams used to explain a conventional interframe interpolation system.
Figure 1B:
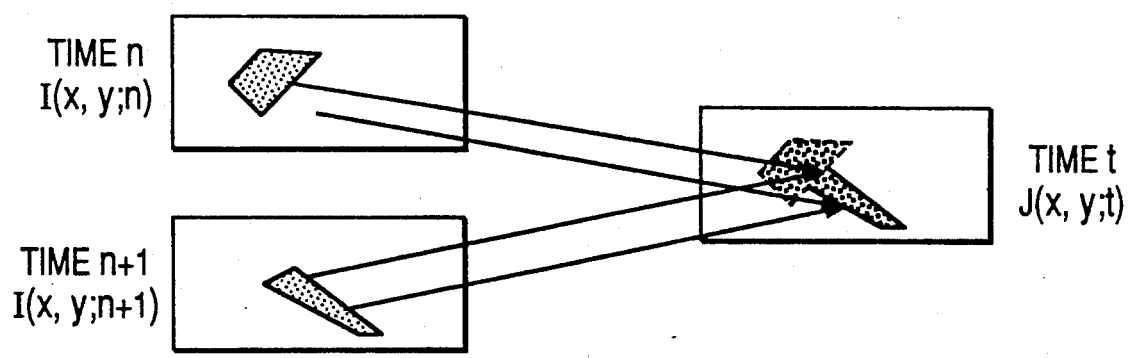
Figure 2A:
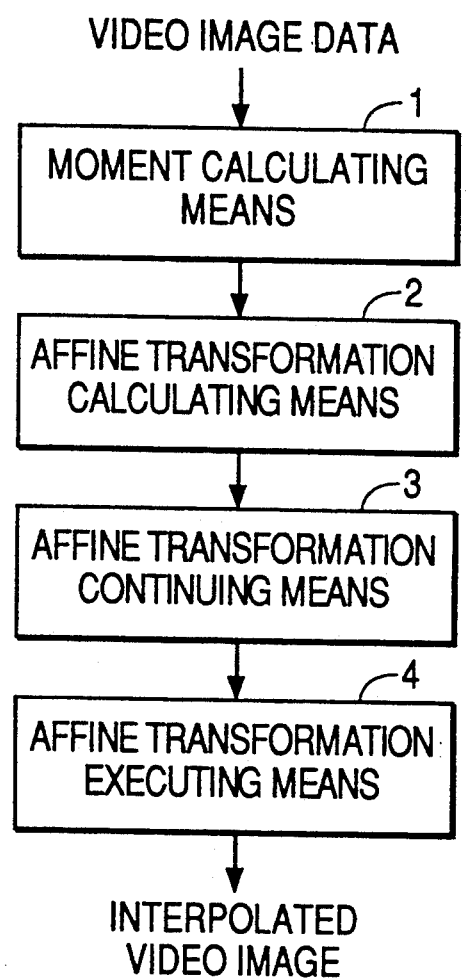
FIGS. 2A and 2B are function block diagrams, used to explain the principle of the present invention.

The principle of the present invention is described below with reference initially to FIGS. 2A and 2B. FIG. 2A shows in a block diagram form the principle of the first principle of the present invention.

As shown in FIG. 2A, a moment calculating means 1 calculates primary and secondary moments of a video image and utilizes these primary and secondary moments to calculate, for example, coordinates of centroid of video image and central moments.

An affine transformation calculating means 2 utilizes the coordinates of centroid of video images and central moments, calculated by the moment calculating means 1 from first-frame video image $I_1$ and second-frame video image $I_2$, to determine an affine transformation (G) which geometrically transforms the first frame video image into the second frame video image. Coefficients calculated for the affine transformation herein are, for example, direction $\theta$ of the principal axis of inertia of each video image, moment $\lambda$ about the principal axis of inertia, moment $\kappa$ about the axis perpendicular to the principal axis of inertia and matrix elements and vector elements for transforming coordinates indicating the first frame picture into coordinates indicating the second frame picture.

Then, an affine transformation continuing means 3 multiplies by a constant t infinitesimal transformation A given by the relation G=expA, as the affine transformation G transforms the first frame video image calculated by the affine transformation calculating means 2 into the second frame video image, and then obtains exponential transformation exp(At) as a continued affine transformation. An affine transformation executing means 4 executes the continued affine transformation exp(At) onto the first frame video image $I_1$ to thereby obtain a video image at a time after an arbitrary time (t seconds) from a time corresponding to the video image of the first frame.

Figure 2B:
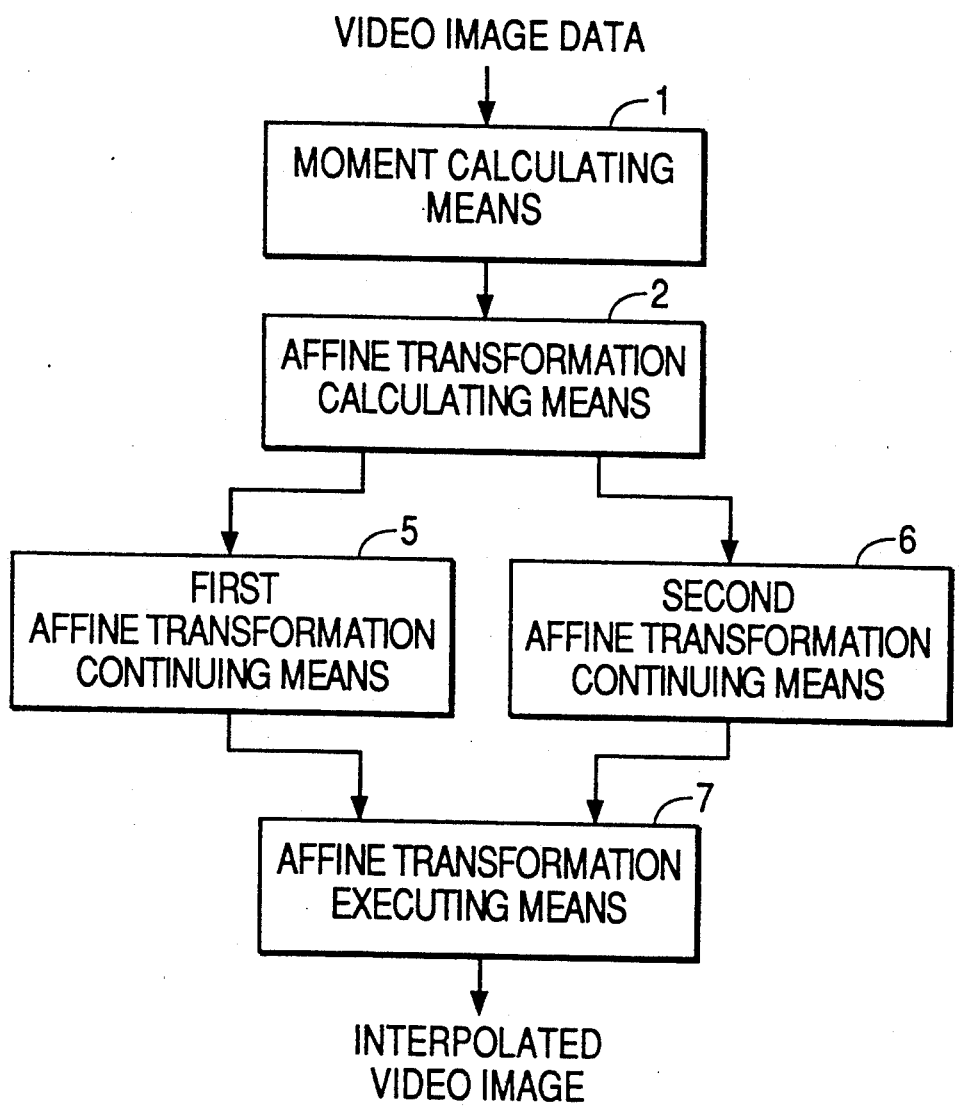

FIG. 2B shows in a function block form the second principle of the present invention.

Referring to FIG. 2B, the actions of the moment calculating means 1 and the affine transformation calculating means 2 are exactly the same as those of the first embodiment shown in FIG. 2A.

As shown in FIG. 2B, in exactly the same manner as the affine transformation continuing means 3 in the first principle, a first affine transformation continuing means 5 multiplies by the constant t the infinitesimal transformation A, given by the relation G=expA. The affine transformation G geometrically transforms the first video image $I_1$ calculated by the affine transformation calculating means 2 into the second frame video image $I_2$, and obtains the exponential transformation exp(At) as the first continued affine transformation. A second affine transformation continuing means 6 multiplies the infinitesimal transformation A by a different constant (t−1) and obtains exponential transformation exp(A (t−1)) as a second continued affine transformation.

An affine transformation executing means 7 obtains a video image at an arbitrary time t after the first frame and before the second frame as a linear sum of a result provided by executing the transformation exp(At) provided as the output of the first affine transformation continuing means 5 to the first frame video image $I_1$ and a result provided by executing the transformation exp(A (t−1)) provided as the output of the second affine transformation continuing means 6 to the second frame video image $I_2$.

As described above, the first principle is equivalent to the case in which the affine transformation executing means 7 obtains the video image at an arbitrary time using only the output of the first affine transformation continuing means 5 and not the output of the second affine transformation continuing means 6 used in the second principle. Therefore, it can be considered that the first principle forms one portion of the second principle, and the action of the second principle will be mainly explained hereinafter.

For example, in a system for interpolating a real moving picture between frames, or in a system in which a video image at an arbitrary time t between time n and time n+1 is produced for time-series video images given at discrete times 1, 2, ... n, n+1, ..., most specific feature of the present invention is that an approximately elliptic video image can be obtained from primary and secondary moments of an arbitrary video image and that the arbitrary video image can be transformed linearly by "rotation", "translation" and "contraction", according to the known affine transformation. Therefore, in the present invention, approximate ellipses of original video images at time n and time n+1 are obtained, the affine transformation between the two video images is calculated from these two approximate elliptic video images, and a continued affine transformation {exp(At), exp(A (t−1))} obtained by making the affine transformation continuous with regard to time based on the infinitesimal transformation (A) of the affine transformation is executed on the original video images, that is, the original video images at time n and time n+1. Thus, the video image at time t is obtained. The principle of the present invention will be described hereinafter in detail.

To follow the change in position and shape of the object, let us consider an affine transformation by which a first frame video image (video image at time n) is transformed into a second frame video image (video image at time n+1).

In the present invention, as shown in FIG. 3A, centroid, principal axes of inertia, and moments about principal axes of inertia and moments about axes perpendicular to the principal axes of inertia are initially calculated from the first and second frame video images. Then, the affine transformation through which the characteristics of the first frame video image are transferred into those of the second frame video image is obtained. Further, this affine transformation is continued with respect to time and this continued affine transformation is executed, for example, onto the first frame video image to thereby estimate a video image at the arbitrary time t.

The affine transformation for connecting characteristics is explained below.

Assume that $(X_1, Y_1)$ and $(X_2, Y_2)$ are coordinates of centroid of the first video image $I_1(x, y)$ and the second video image $I_2(x, y)$, $\theta_1$ and $\theta_2$ are angles formed by the principal axis of inertia forms x axis, and $EXP(\lambda_1)$, $EXP(\lambda_2)$, $EXP(\kappa_1)$ and $EXP(\kappa_2)$ are moments about axes perpendicular to the principal axis of inertia.

Herein, the following are established:

$$X_1 = \iint x I_1(x, y)dxdy / \iint I_1(x, y)dxdy$$
$$Y_1 = \iint y I_1(x, y)dxdy / \iint I_1(x, y)dxdy$$
$$\tan(2\theta_1) = 2M_{1xy}/(M_{1xx} - M_{1yy})$$

$$EXP(2\kappa_1) = \frac{(M_{1xx} + M_{1yy}) + \sqrt{((M_{1xx} - M_{1yy})^2 + 4M_{1xy})}}{2}$$

$$EXP(2\lambda_1) = \frac{(M_{1xx} + M_{1yy}) - \sqrt{((M_{1xx} - M_{1yy})^2 + 4M_{1xy})}}{2}$$

$$M_{1XX} = \iint (x - X_1)^2 I_1(x, y)dxdy / \iint I_1(x, y)dxdy$$
$$M_{1YY} = \iint (y - Y_1)^2 I_1(x, y)dxdy / \iint I_1(x, y)dxdy$$
$$M_{1XY} = \iint (x - X_1)(y - Y_1)I_1(x, y)dxdy / \iint I_1(x, y)dxdy$$
$$X_2 = \iint x I_2(x, y)dxdy / \iint I_2(x, y)dxdy$$
$$Y_2 = \iint y I_2(x, y)dxdy / \iint I_2(x, y)dxdy$$
$$\tan(2\theta_2) = 2M_{2xy}/(M_{2xx} - M_{2yy})$$

$$EXP(2\kappa_2) = \frac{(M_{2xx} + M_{2yy}) + \sqrt{((M_{2xx} - M_{2yy})^2 + 4M_{2xy})}}{2}$$

$$EXP(2\lambda_2) = \frac{(M_{2xx} + M_{2yy}) - \sqrt{((M_{2xx} - M_{2yy})^2 + 4M_{2xy})}}{2}$$

$$M_{2XX} = \iint (x - X_2)^2 I_2(x, y)dxdy / \iint I_2(x, y)dxdy$$
$$M_{2YY} = \iint (y - Y_2)^2 I_2(x, y)dxdy / \iint I_2(x, y)dxdy$$
$$M_{2XY} = \iint (x - X_2)(y - Y_2)I_2(x, y)dxdy / \iint I_2(x, y)dxdy$$

$M_{1XX}$ and $M_{1YY}$ are equations of central moments and are normalized by the division of $\iint I_1(x,y)dxdy$, i.e., the zero-order moment $m_O$. Thus, when the second video image $I_2(x, y)$, for example, is $\alpha$ times the first video image $I_1(x, y)$, that is, the increased $\alpha$ times by the ambient illumination, the change of shape of the video image can be extracted regardless of the change of the brightness of the entirety.

Further, assume that $T(X, Y)$ is a transformation in which the video image is translated by X in the x axis direction and by Y in the y axis direction, that $R(\theta)$ is a transformation in which the image is rotated about an origin by $\theta$ and that $M(\kappa, \lambda)$ is a transformation in which the video image is expanded and contracted $\exp(\kappa)$ times in the x axis direction and $\exp(\lambda)$ times in the y axis direction. These transformations are operations (affine transformations) which act not only on the video image space but also on the characteristic space.

At that time, characteristic $F_1=(X_1, Y_1, \theta_1, \kappa_1, \lambda_1)$ of the first video image and characteristic $F_2=(X_2, Y_2, \theta_2, \kappa_2, \lambda_2)$ of the second video image are obtained by executing, as shown in FIG. 3A, the following transformations on origin $F_0=(0, 0, 0, 0, 0)$ of characteristic space:

$$F_1 = G_1 * F_0 \quad (1)$$
$$G_1 = T(X_1, Y_1)R(\theta_1)M(\kappa_1, \lambda_1)$$
$$F_2 = G_2 * F_0 \quad (2)$$
$$G_2 = T(X_2, Y_2)R(\theta_2)M(\kappa_2, \lambda_2)$$

From equations (1) and (2), it is clear that the characteristic $F_2$ of the second video image is equal to the result provided by executing the following transformation on the characteristic $F_1$ of the first video image:

$$F_2 = G_2 G_1^{-1} * F_1 \quad (3)$$

The process for continuing the affine transformation is explained below.

Initially, a continued affine transformation $G(t)$ for transforming the moment characteristic $F_1$ of the first video image into characteristic $F(t)$ of an arbitrary time from a time standpoint is obtained from the equation (3).

Requesting that $F(t)$ coincides with $F_2$ after the unit time yields the following equation:

$$F(t) = G(t) * F_1, \quad (4)$$
$$F(0) = F_1, F(1) = F_2$$

Although an infinite number of transformations satisfy equation (4), the one that satisfies the following condition is obtained:

$$F(t) = \exp(At)F_1 \quad (5)$$

where A represents a transformation independent of time.

Equation (5) means that the characteristic is successively changed by the infinitesimal transformation A. That is, $$\exp(At)\ (e^{Ah})^{t/h} = \overbrace{e^{Ah} e^{Ah} e^{Ah} \ldots}^{t/h \text{ times}}$$

where h is the step-size of time $\approx 0$. Accordingly, $G(t)$ is obtained by using infinitesimal transformation A which satisfies $G_2 * G_1^{-1} = \exp(A)$ as follows:

$$G(t) = \exp(At) \quad (6)$$

Equations (4) and (6) express the position and shape of an object at an arbitrary time t. From these equations, it is possible to understand the moving state of a physical object, such as a change in its position and shape, from a time standpoint.

A process for estimating a video image at an arbitrary time is explained below.

Assume that $I_1(x, y)$ is the first video image and $I_2(x, y)$ is the second video image. A video image at an arbitrary time is obtained by executing the affine transformation determined by equation (6) onto the first video image $I_1(x, y)$. More precisely, $$I(x,y;t) = G(t) * I_1(x, y) \qquad (7)$$

However, $G(1) * I_1(x, y)$ and $I_2(x, y)$ do not always coincide.

Accordingly, let us consider a method for estimating the video image $I(x,y;t)$ at time t by overlapping $G(t) I_1(x, y)$ and $G^{-1}(1-t) * I_2(x, y)$ as:

$$I(x,y;t) = (1-t)G(t) * I_1(x, y) + tG^{-1}(1-t) * I_2(x, y) \qquad (8)$$

In accordance with equation (8), $I(x,y;t)$ coincides with the first video image at time $t=0$ and with the second video image at time $t=1$.

Figure 3B:
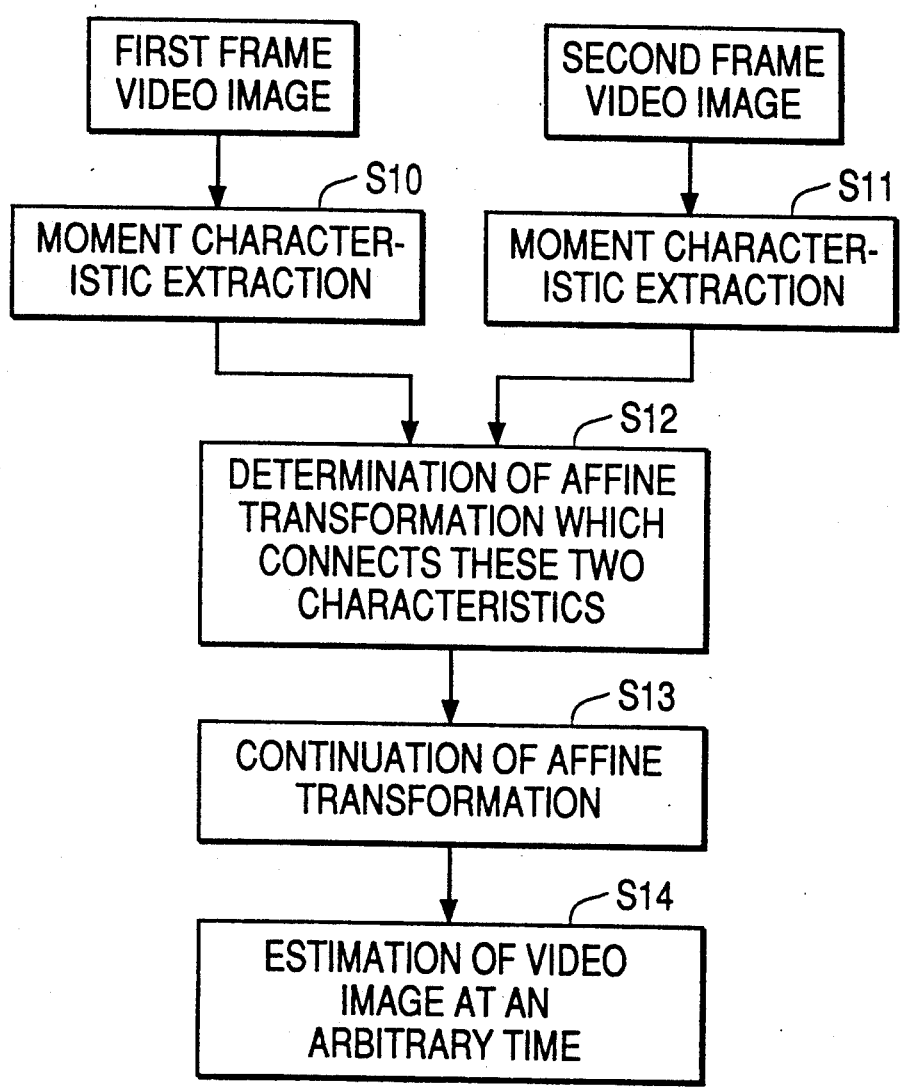

FIG. 3B is a flowchart used to explain the principle of the video image estimating system of the present invention.

Referring to FIG. 3B, in step S10, the moment characteristic $F_1$ of the video image is extracted from the first video image and in step S11, the moment characteristic $F_2$ is extracted from the second video image. In step S12, the affine transformation g(t) which connects these two characteristics is determined, and in the next step S13, the affine transformation is continued using equation (6). In the next step S14, the video image at an arbitrary time t is estimated from equation (8).

As described above, according to the present invention, a video image at an arbitrary time t between time n and time n+1 in a time sequence as one portion of the sequential change from the video image at time n to the video image at time n+1 of video images at discrete times 1, 2, ... n, n+1, ..., is estimated based on the infinitesimal transformation (A) of the affine transformation which connects the characteristics of two video images. Therefore, a video image at time t can be produced selectively.

Figure 4:
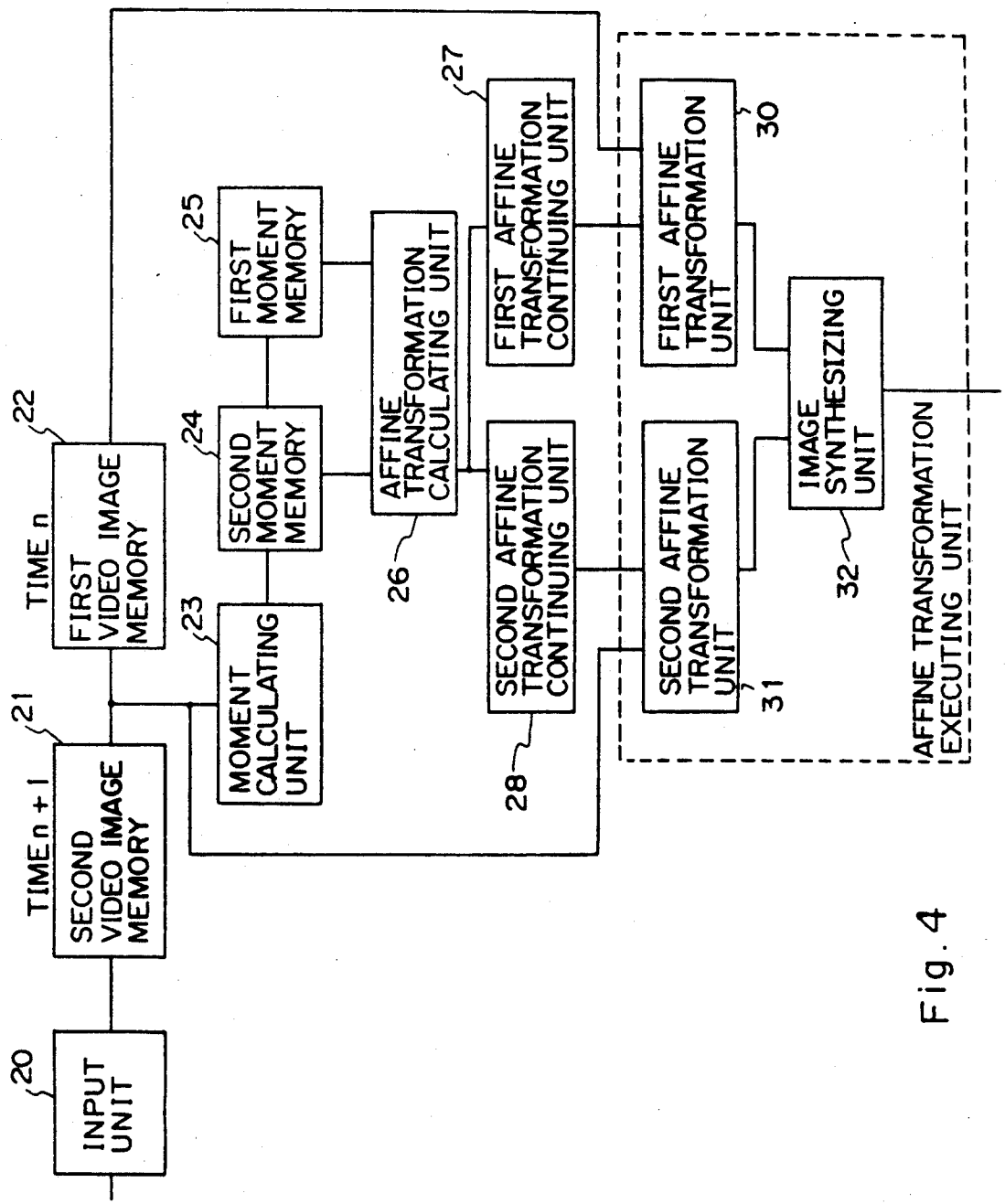
FIG. 4 is a schematic block diagram showing a first embodiment of a system which utilizes the moving video image estimation system of the present invention.

The present invention will be described more fully with reference to the following drawings. FIG. 4 is a schematic block diagram showing the first embodiment of a video image data interpolating system which utilizes the moving video image estimation system of the present invention.

Referring to FIG. 4, an input unit 20 converts video images input in a time series into a digital video image. The digitized video image is input to a second video image memory 21, and the video image stored in the second video image memory 21 is then input to a first video image memory 22.

Accordingly, the first video image memory 22 stores the video image at time n and the second video image memory 21 stores the video image at time n+1.

A moment calculating unit 23 calculates from the aforementioned equations primary and secondary moments of the video image at time n+1 stored in the second video image memory 21. The calculated result is input to a second moment memory 24, and the moment characteristic stored in the second moment memory 24 is then input to a first moment memory 25.

Accordingly, the first moment memory 25 stores the moment of the video image at time n and the second moment memory 24 stores the moment of the video image at time n+1.

From these moments, an affine transformation calculating unit 26 calculates from equations (1) to (3) an affine transformation which transforms the moment characteristic of the video image at time n into the moment characteristic of the video image at time n+1.

First and second affine transformation continuing units 27 and 28 calculate infinitesimal transformation A of the affine transformation within equation (5) and then calculate continuing affine transformation from a time standpoint from equation (6) or the following equation:

$$G(t) = \exp(A(t-1))$$

where the variable t, indicative of time, uses time n as its starting point.

A first affine transformation unit 30 and a second affine transformation unit 31 within an affine transformation executing unit 29 execute continued affine transformations on the video image at time n and the video image at time n+1, respectively, and results thereof are synthesized by an image synthesizing unit 32 in accordance with equation (8).

Figure 5:
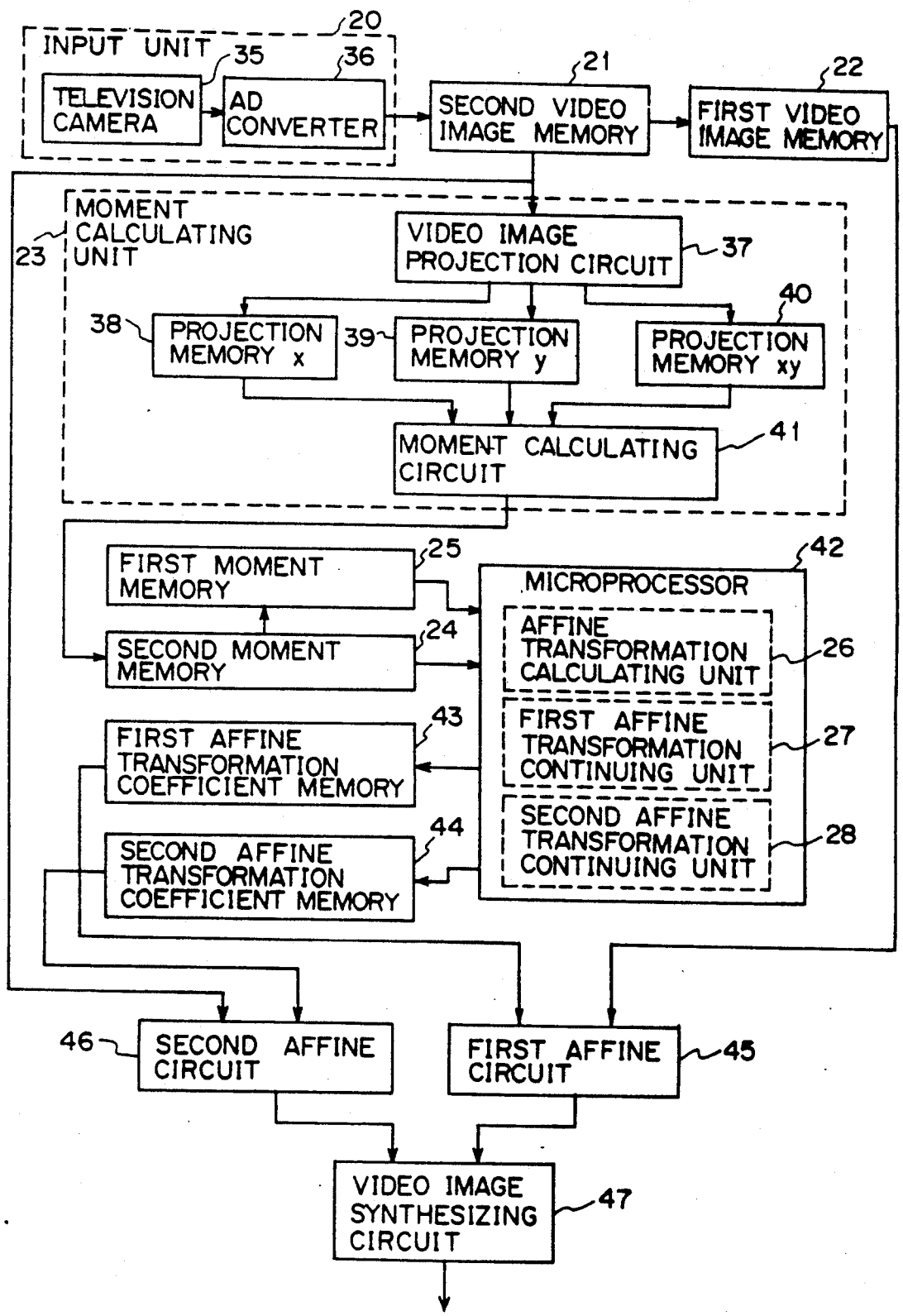
FIG. 5 is a schematic block diagram showing an arrangement of a hardware of the first embodiment shown in FIG. 4.

FIG. 5 shows a hardware arrangement of the first embodiment of the system shown in FIG. 4. The hardware of FIG. 5 is different from that in the block diagram of FIG. 4 in that in FIG. 5 the input unit 20 is composed of a television camera 35 and an analog-to-digital converter 36; the moment calculating unit 23 is composed of a video image projection circuit 37, three projection memories 38 to 40 for storing projections to the X axis, the Y axis and the oblique axis, and a moment calculating circuit 41; the affine transformation calculating unit 26, the first affine transformation continuing unit 27 and the second affine transformation continuing unit 28 form one portion of a microprocessor 42; and the first affine transformation unit 30 is composed of a first affine transformation coefficient memory 43 and a first affine circuit 45; the second affine transformation unit 31 is composed of a second affine transformation coefficient memory 44 and a second affine circuit 46: The video image synthesizing unit 32 in FIG. 4 is equivalent to the video image synthesizing circuit 47.

Prior to the detailed explanation of the processing of the respective units of the first embodiment of the system shown in FIGS. 4 and 5, let us explain how to obtain the affine transformation G(t) given by equation (6).

The affine transformation G(t) is given by equation (6) and A in this equation is determined as:

$$G_2 * G_1^{-1} = \exp(A)$$

However, it is not easy to directly calculate the above equation, and in actual practice, G(t) is calculated from the following mathematical relation Affine transformation G given by $$G_2 * G_1^{-1} = G$$

is expressed by the following 3×3 matrix:

$$G = \begin{bmatrix} L, & B \\ 0, & 1 \end{bmatrix} \qquad (9)$$

In equation (9), L is a 2×2 matrix and B is a vector, and by this transformation, point (x, y) is moved according to:

$$\begin{bmatrix} x' \\ y' \end{bmatrix} = \begin{bmatrix} L_{11} & L_{12} \\ L_{21} & L_{22} \end{bmatrix} \begin{bmatrix} x \\ y \end{bmatrix} + \begin{bmatrix} B_1 \\ B_2 \end{bmatrix} \quad (10)$$

$L_{11}$ and $B_1$ are given by the following equations in accordance with the equations (1) to (3):

$$L = \begin{bmatrix} \cos\theta_2 & -\sin\theta_2 \\ \sin\theta_2 & \cos\theta_3 \end{bmatrix} \begin{bmatrix} \exp(\kappa_2 - \kappa_1) & 0 \\ 0 & \exp(\lambda_2 - \lambda_1) \end{bmatrix} \quad (11)$$

$$\begin{bmatrix} \cos\theta_1 & \sin\theta_1 \\ -\sin\theta_1 & \cos\theta_1 \end{bmatrix}$$

$$B = -L \begin{bmatrix} X_1 \\ Y_1 \end{bmatrix} + \begin{bmatrix} X_2 \\ Y_2 \end{bmatrix} \quad (12)$$

The matrix L is expressed by matrix u of an infinitesimal transformation as:

$$L = \exp u \quad (13)$$

The shape of u is obtained later, and A which is expressed by the relation $G = \exp A$ is expressed by the following equation:

$$A = \begin{bmatrix} u & u(L-E)^{-1}B \\ 0, & 0 \end{bmatrix} \quad (14)$$

This equation can be confirmed in actual practice by calculating the following equation:

$$\exp A = 1 + A + A^2/2 + A^3/3! + \quad (15)$$

Incidentally, E in equation (14) is the unit matrix. Then, $G(t) = \exp At$ can be expressed as $$G(t) = \exp At = 1 + At + (At)2/2 + (At)3/3! + \ldots = \quad (16)$$

$$\begin{bmatrix} l(t), & (l(t) - E)(L - E)^{-1}B \\ 0, & 1 \end{bmatrix}$$

where $l(t) = \exp ut$. In equation (16), B and L are given already and hence, $l(t) = \exp ut$ may be calculated.

In this case, if eigenvalues of L are $\exp\alpha$ and $\exp\beta$, then L is expressed by utilizing regular matrix P as follows:

$$L = P^{-1} \begin{bmatrix} \exp\alpha & 0 \\ 0 & \exp\beta \end{bmatrix} P \quad (17)$$

Multiplying by P from the left of this equation and $P^{-1}$ from the left thereof yields $$PLP^{-1} = \begin{bmatrix} \exp\alpha & 0 \\ 0 & \exp\beta \end{bmatrix} = \exp\begin{bmatrix} \alpha & 0 \\ 0 & \beta \end{bmatrix} \quad (18)$$

Since $L = \exp u$, $$P \exp pu \, P^{-1} = \exp Pu \, P^{-1} = \exp\begin{bmatrix} \alpha & 0 \\ 0 & \beta \end{bmatrix} \quad (19)$$

Thus, $$Pu \, P^{-1} = \begin{bmatrix} \alpha & 0 \\ 0 & \beta \end{bmatrix}, u = P\begin{bmatrix} \alpha & 0 \\ 0 & \beta \end{bmatrix} P^{-1} \quad (20)$$

Accordingly, $$l(t) = \exp ut = \exp P \begin{bmatrix} \alpha & 0 \\ 0 & \beta \end{bmatrix} P^{-1} t = P \begin{bmatrix} \exp\alpha t & 0 \\ 0 & \exp\beta t \end{bmatrix} P^{-1} \quad (21)$$

In other words, respective matrix elements of l(t) can be expressed by linear expression of $\exp\alpha t$ and $\exp\beta t$, i.e. by substituting l(t) into the following equation:

$$l(t) \begin{bmatrix} r_{11}\exp\alpha t + s_{11}\exp\beta t & r_{12}\exp\alpha t + a_{12}\exp\beta t \\ r_{21}\exp\alpha t + s_{21}\exp\beta t & r_{22}\exp\alpha t + s_{22}\exp\beta t \end{bmatrix} \quad (22)$$

From the condition of l(0) = identical transformation and l(1) = L, $r_{ij}$ and $s_{ij}$ in the above equations are obtained. That is, $$l(0) = \begin{bmatrix} r_{11} + s_{11} & r_{12} + s_{12} \\ r_{21} + s_{21} & r_{22} + s_{22} \end{bmatrix} = \begin{bmatrix} 1 & 0 \\ 0 & 1 \end{bmatrix} \quad (23)$$

$$l(1) \begin{bmatrix} r_{11}\exp\alpha + s_{11}\exp\beta & r_{12}\exp\alpha + a_{12}\exp\beta \\ r_{21}\exp\alpha + s_{21}\exp\beta & r_{22}\exp\alpha + s_{22}\exp\beta \end{bmatrix} = \quad (24)$$

$$\begin{bmatrix} L_{11} & L_{12} \\ L_{21} & L_{22} \end{bmatrix}$$

From these relations, $r_{ij}$ and $s_{ij}$ are obtained, and equations (22) yields $$l(t) = \frac{\exp\alpha t - \exp\beta t}{\exp\alpha - \exp\beta} \begin{bmatrix} L_{11} & L_{12} \\ L_{21} & L_{22} \end{bmatrix} - \quad (25)$$

$$\frac{\exp(\alpha t - \beta) - \exp(\alpha - \beta t)}{\exp\beta - \exp\beta} \begin{bmatrix} 1 & 0 \\ 0 & 1 \end{bmatrix}$$

From equation (11), it is to be understood that the eigenvalues of L are $\exp(\kappa 2 - \kappa 1)$ and $\exp(\lambda 2 - \lambda 1)$, and these eigenvalues yield $$l(t) = \begin{bmatrix} \cos\theta_1 & -\sin\theta_1 \\ \sin\theta_1 & \cos\theta_1 \end{bmatrix} \begin{bmatrix} h_{11} & h_{12} \\ h_{21} & h_{22} \end{bmatrix} \begin{bmatrix} \cos\theta_1 & \sin\theta_1 \\ -\sin\theta_1 & \cos\theta_1 \end{bmatrix} \quad (26)$$

where $$h_{11} = \exp \lambda t (\exp \kappa \cos \theta \sin \phi t - \sin(t-1)\phi)/\sin\phi \quad (27)$$
$$h_{12} = \exp \lambda t (-\exp(-\kappa)\sin \theta \sin \phi t/\sin \phi$$
$$h_{21} = \exp \lambda t (\exp \kappa \sin \theta \sin \phi t)/\sin \phi$$
$$h_{22} = \exp \lambda t (-\exp(-\kappa)\cos \theta \sin \phi t -$$
$$\sin(t-1)\phi)/\sin \phi$$
$$\theta = \theta_2 - \theta_1$$
$$\lambda = (\kappa_2 - \kappa_1 + \lambda_2 - \lambda_1)/2$$
$$\kappa = (\kappa_2 - \kappa_1 - \lambda_2 + \lambda_1)/2$$
$$\cos \phi = \cos h \kappa \cos \theta$$

In actual calculation, if l(t) is calculated from equations (26) and (27), then all elements of G(t) are determined by equation (16).

As described above, in actual practice, G(t) is calculated directly without calculating specific values of A. However, the obtained value becomes coincident with that of G(t)=exp At in which A as given by G=exp A is employed.

Figure 6:
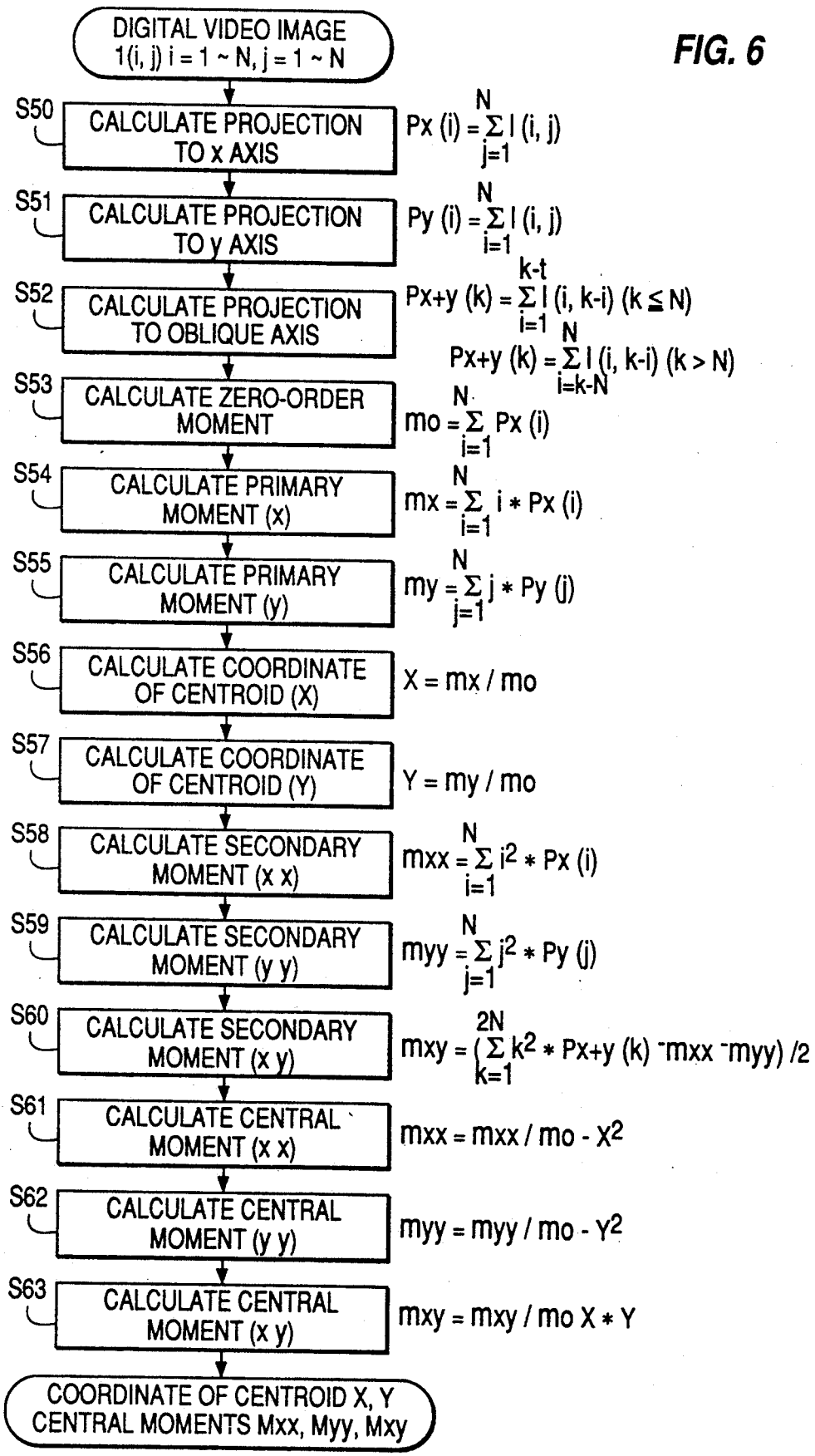
FIG. 6 is a flowchart used to explain a video image moment characteristic extracting process.

FIG. 6 is a flowchart used to explain the process in which the moment characteristic of the video image is extracted by the moment calculating unit.

Figure 7:
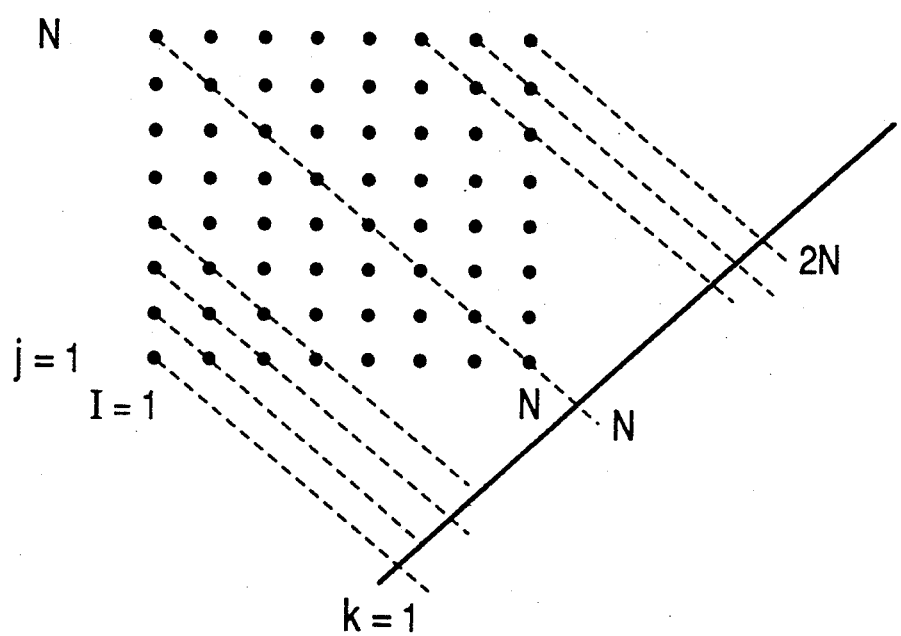
FIG. 7 is a schematic representation used to explain how to calculate a projection onto an oblique axis.

Referring to FIG. 6, from the digital video image I(i, j), projection to the x axis is calculated in step S50, projection to the y axis is obtained in step S51, and projection to the oblique axis is obtained in step S52. In the equations for calculating these projections, as in the diagram used to explain the projection to the oblique axis of FIG. 7, N represents the size of the video image, that is, the length of one side. When the video image is expressed as I (i, j), i and j take integer values from 1 to N. However, in the equation $P_X + Y(\kappa)$, $\kappa$ takes integer values ranging from 1 to 2N. If $\kappa$ is less than N, the projection to the oblique axis is obtained from the upper equation, while if $\kappa$ is larger than N, the projection to the oblique axis is calculated from the lower equation. The projection to the oblique axis is equivalent to the process in which the sum of pixel data is calculated in the oblique direction as shown in FIG. 7.

Referring to FIG. 6, zero-order moment m* is calculated in step S53, primary moment $m_X$ and $m_Y$ are calculated in steps S54 and S55 and centroid coordinates X and Y are calculated at steps S56 and S57.

Further, secondary moments $m_{XX}$, $m_{YY}$ and $m_{XY}$ are calculated in steps S58, S59 and S60, and central moments $M_{XX}$, $M_{YY}$ and $M_{XY}$ are calculated in steps S61, S62 and S63. Then, the processing is ended.

Incidentally, the equation of central moments $M_{XX}$, $M_{YY}$ and $M_{XY}$ is substantially the same that earlier noted and, by way of example, the following equation is established:

$$\begin{aligned}
M_{1XX} &= \iint (x - X_1)^2 I_1(x, y) dxdy / \iint I_1(x, y) dxdy \\
&= \iint (x^2 - 2xX_1 + X_1^2) I_1(x, y) dxdy / \iint I_1(x, y) dxdy \\
&= \iint x^2 I_1(x, y) dxdy / \iint I_1(x, y) dxdy - \\
&\quad 2X_1 \iint I_1(x, y) dxdy \iint I_1(x, y) \\
&\quad dxdy + X_1^2 \iint I_1(x, y) dxdy / \iint I_1(x, y) dxdy \\
&= m_{xx}/m_0 - 2X_1 X_1 + X_1^2 = m_{xx}/m_0 - X_1^2
\end{aligned}$$

FIG. 8 is a flowchart used to explain the process wherein affine transformation is determined by the affine transformation calculating unit.

Referring to FIG. 8, in steps S65, S66 and S67, by utilizing the centroid and central moment of the first video image, direction $\theta_1$ of the principal axis of inertia, moment $\kappa_1$ of the axis perpendicular to the principal axis of inertia and moment $\lambda_1$ about the principal axis of inertia are calculated. Then, in steps S68, S69 and S70, by utilizing the centroid and central moment of the second video image, direction $\theta_2$ of the principal axis of inertia, moment $\kappa_2$ of the axis perpendicular to the principal axis of inertia and moment $\lambda_2$ about the principal axis of inertia are calculated. Then, the affine transformation is calculated by using these elements at step S71, and the processing is ended.

FIG. 9 is a flowchart used to explain the process in which the first affine transformation is continued by the first affine transformation continuing unit. This continuing process is executed by using affine transformation coefficients $\theta$, $\lambda$ and $\kappa$, matrix element Lij and vector element Bi calculated by the affine transformation calculating unit in FIG. 8. Referring to FIG. 8, time t is set in step S73, matrix element hij is calculated by using the equation (27) in step S74 and matrix element lij(t) of the affine transformation given by the following equation is calculated in step S75:

$$\begin{bmatrix} x' \\ y' \end{bmatrix} = \begin{bmatrix} l_{11}(t) & l_{12}(t) \\ l_{21}(t) & l_{22}(t) \end{bmatrix} \begin{bmatrix} x \\ y \end{bmatrix} + \begin{bmatrix} b_1(t) \\ b_2(t) \end{bmatrix}$$

In step S76, element Pij of the matrix for calculating the vector element bi(t) in the above equation is calculated, and in step S77, the vector element bi(t) is calculated and then the processing is ended. Incidentally, the thus obtained $b_1(t)$ and $b_2(t)$ are the calculated results of $(1(t)-E)(L-E)^{-1}B$ in equation (16).

FIG. 10 is a flowchart used to explain the process wherein the second affine transformation is continued by the second affine transformation unit. FIG. 10 is similar to FIG. 9. Referring to FIG. 10, time t is set in step S80. In step S81, (t−1) is substituted for t, and then processes similar to those in steps S74 to S77 are performed in steps S82 to S85, and matrix element lij'(t) and vector element bi'(t) are calculated. Then, the processing is ended.

Figure 11:
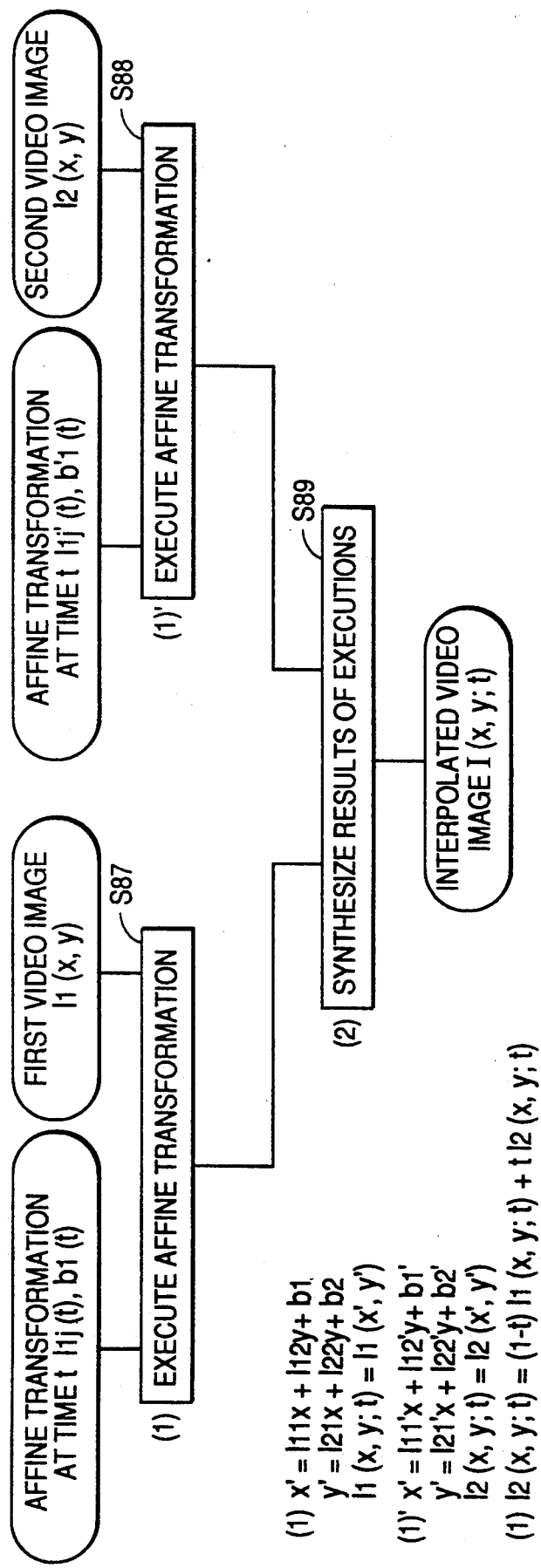
FIG. 11 is a flowchart used to explain how to assume a video image at an arbitrary time.

FIG. 11 is a flowchart used to explain the process wherein a video image at an arbitrary time is estimated by the video image synthesizing unit.

Referring to FIG. 11, at step S87, the affine transformation calculated in FIG. 9 is executed on the first video image $I_1$, and in step S88 the affine transformation obtained in FIG. 10 is executed on the second video image $I_2$. In step S89, the results of these executions are synthesized to obtain an interpolated video image at time t.

Figure 12C:
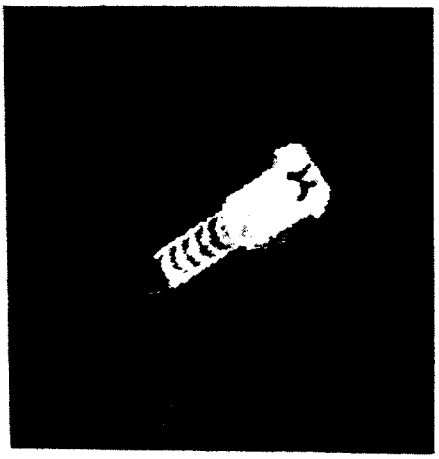
FIGS. 12A to 12F are views showing examples of video images provided by the moving video image estimation system of the present invention.
Figure 12B:
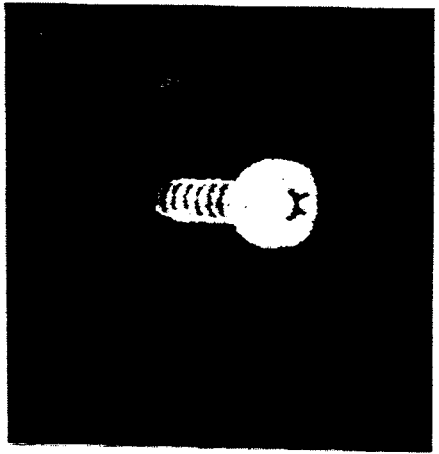
Figure 12A:
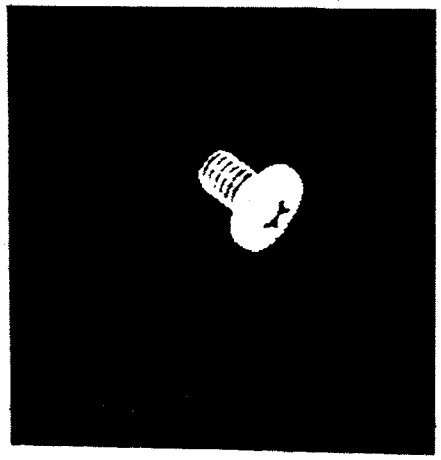
Figure 12F:
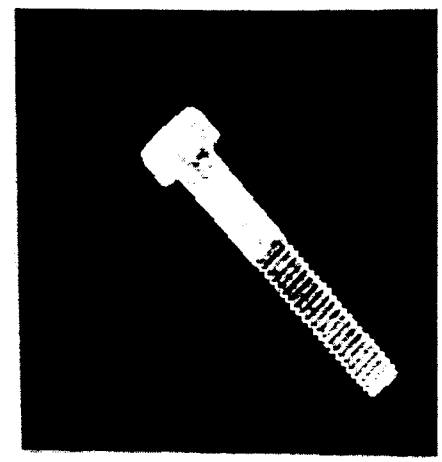
Figure 12E:
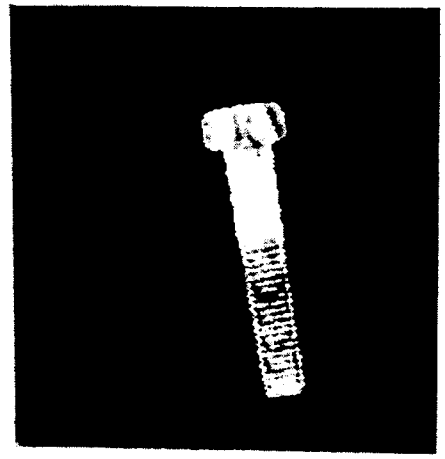
Figure 12D:
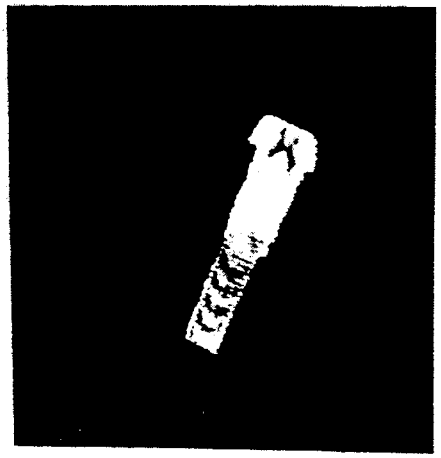

FIGS. 12A to 12F show examples of the results of interpolated video images. FIG. 12A shows the first video image, FIG. 12F shows the second video image, and FIGS. 12B to 12E show interpolated video images at times between the first and second video images.

The embodiment described above is a moving video image estimation system for interpolating an image at an arbitrary time between time n for a first video frame image and a time n+1 for a second frame video image. A moving video image estimation system for predicting an image after a time n+1, namely, an arbitrary time after the second frame video image, is explained hereinafter.

A video image prediction can be performed by making time t after the first frame video image larger than "1", i.e. providing t>1 in the above embodiment. In this case, first affine transformation unit 30 shown in FIG. 4 executes transformation {exp (At)} as an output of the first affine transformation continuing unit on the first frame video image data $I_1$ stored in the first video image memory 22 and only the result of this transformation is output from video image synthesizing unit 32. However, it is preferable for a prediction of a video image after time t+1 to be performed based on the second frame video image $I_2$ (x,y).

Figure 13:
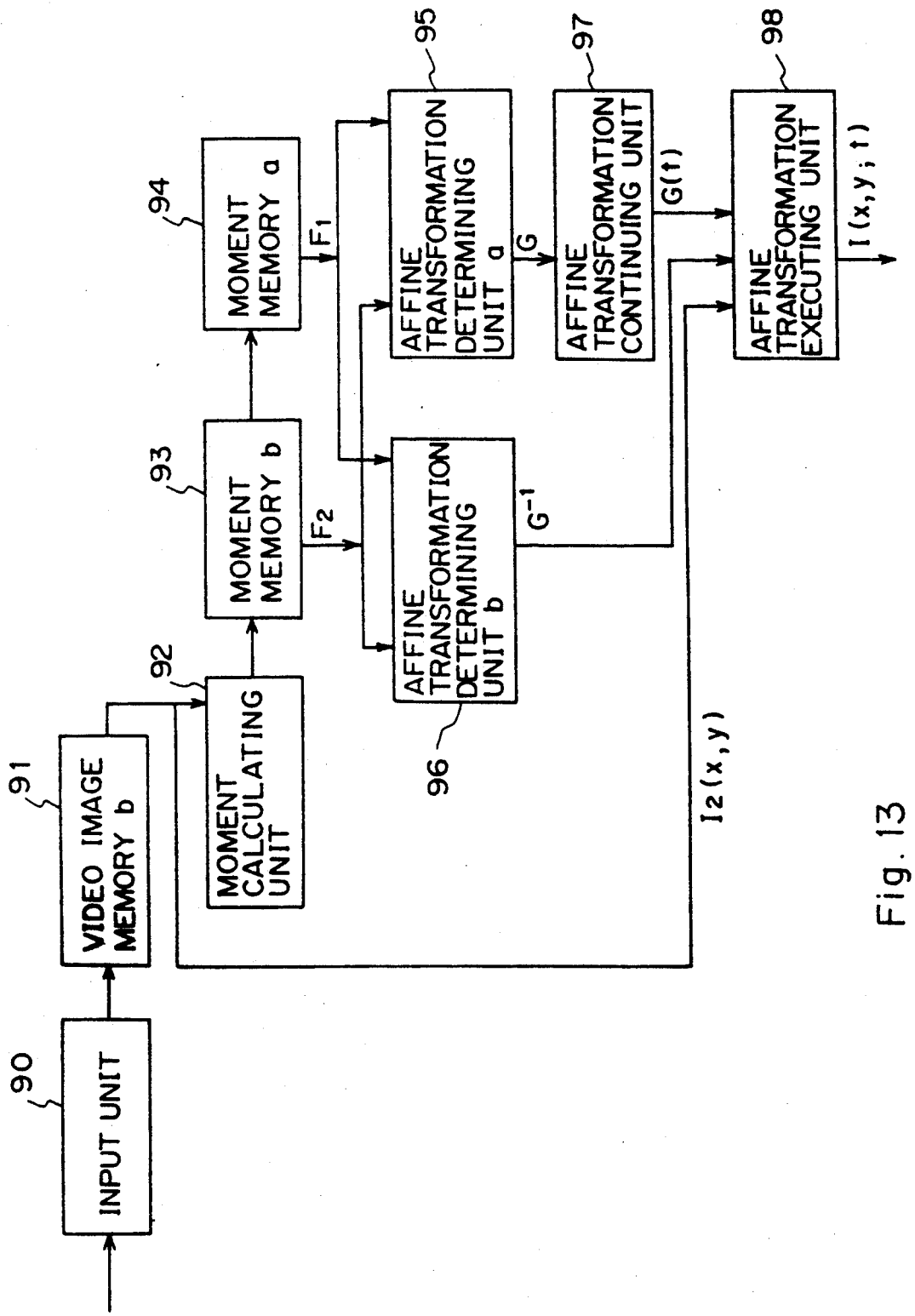
FIG. 13 shows a block diagram of an arrangement of the second embodiment of the moving video image data estimation system.

FIG. 13 is a block diagram of the structure of a second embodiment of the moving video image data estimation system according to the present invention. The present invention predicts a video image at an arbitrary time after time n+1 based on the second frame video image data $I_2$ (x,y) at time n+1. As in the previous embodiment, shown in FIG. 4, this embodiment shown in FIG. 13, comprises an input unit 90, a video image memory b91 corresponding to the second video image memory 21, moment calculating unit 92, moment memory a94 and moment memory b93 corresponding to the first and second moment memories 25 and 24, affine transformation determining unit a95 corresponding to affine transformation calculating unit 26 and affine transformation continuing unit 97 corresponding to the first affine transformation continuing unit 27. The embodiment of FIG. 13 executes the same operation as the embodiment of FIG. 4. However, the embodiment of FIG. 13 does not have a first video image memory 22 or a second affine transformation continuing unit 28, but instead has an affine transformation determining unit b96, which is not provided in the first embodiment shown in FIG. 4. Because of this difference, an affine transformation executing unit 98 executes an operation different from the first embodiment shown in FIG. 4.

The first frame video image at time n is input to input unit 90 and is converted to digital data $I_1$ (x,y). The digital data $I_1$ (x,y) is stored in the image video memory b91 and is transferred to moment calculating unit 92.

Moment calculating unit 92 calculates a moment characteristic $F_1$ ($X_1$, $Y_1$, $\theta_1$, $\kappa_1$, $\lambda_1$) from digital data $I_1$ (x,y) and transmits the calculated $F_1$ data to moment memory b93. Then, moment characteristic $F_1$ of the first frame video image at time n is stored in moment memory b93.

When first frame video image data $I_1$ (x,y) stored in video image memory b91 is output to moment calculating unit 92, it become possible to input the second frame video image at time n+1. The second frame video image at time n+1 is first input to input unit 90 and converted to digital data $I_2$ (x,y), and then stored in video image memory b90. Therefore, the second frame video image memory data $I_2$ (x,y) at time n+1 is stored in video image b91 and the first frame video image data $I_1$ (x,y) at time n is disposed of.

The second frame video image data $I_2$ (x,y) stored in image memory b91 is then transferred to moment calculating unit 92. Moment calculating unit 92 calculates moment characteristic $F_2$ ($X_2$, $Y_2$, 74 2, $\kappa_2$, $\lambda_2$). The calculated moment characteristic $F_3$ of the second frame video memory is transferred to moment memory b93 and at this point, the moment characteristic $F_1$ of the first frame video image stored in the moment memory b93 is transferred to moment memory a94 and stored therein. Therefore, the moment characteristic $F_1$ of the first frame video image is stored in moment memory a94 and moment characteristic $F_2$ of the second frame video image is stored in moment memory b93.

When respective moment characteristics $F_1$ and $F_2$ are stored in moment memories a and b (94 and 93), affine transformation determining units a and b (95 and 96), which receive moment characteristics $F_1$ and $F_2$, are activated. Affine transformation determining unit a95 obtains affine transformation G which converts the moment characteristic $F_1$ of the first frame video image to the moment characteristic $F_2$ of the second frame video image. Affine transformation determining unit b96 obtains affine transformation $G^{-1}$, which converts the moment characteristic $F_2$ of the second frame video image to moment characteristic $F_1$ of the first frame video image. $G^{-1}$ is an inverse transformation of the affine transformation G.

Next, affine transformation G calculated by affine transformation determining unit a95 is transferred to affine transformation continuing unit 97, which obtains affine transformation G(t). The affine transformation G(t) is continuous with regard to time. It is obtained by equation (6) in the same manner as in the first embodiment.

Finally, affine transformation executing unit 98 predicts the video image at an arbitrary time t after time n+1 (t>1). Affine transformation executing unit 98 receives affine transformation G(t) which is obtained by affine transformation continuing unit 97 and is continuous with time, affine transformation $G^{-1}$ for converting the moment characteristic of the second frame video image to the moment characteristic of the first frame video image, and the second frame video image data $I_2$ (x,y).

Affine transformation executing unit 98 utilizes the fact that $I_1$ (x,y) is approximately equal to $G^{-1}*I_2$ (x,y), and instead of using equation (7) uses the equation $$I(x,y;t) = G(t)G^{-1}(1) * I_2(x,y) \qquad (28)$$

where the prediction is performed by using t>1.

G (t) at an arbitrary time t (t>1) after time n+1 is applied to video image obtained by executing the inverse transformation $G^{-1}$ on the second frame video image at time n+1.

Figure 14:
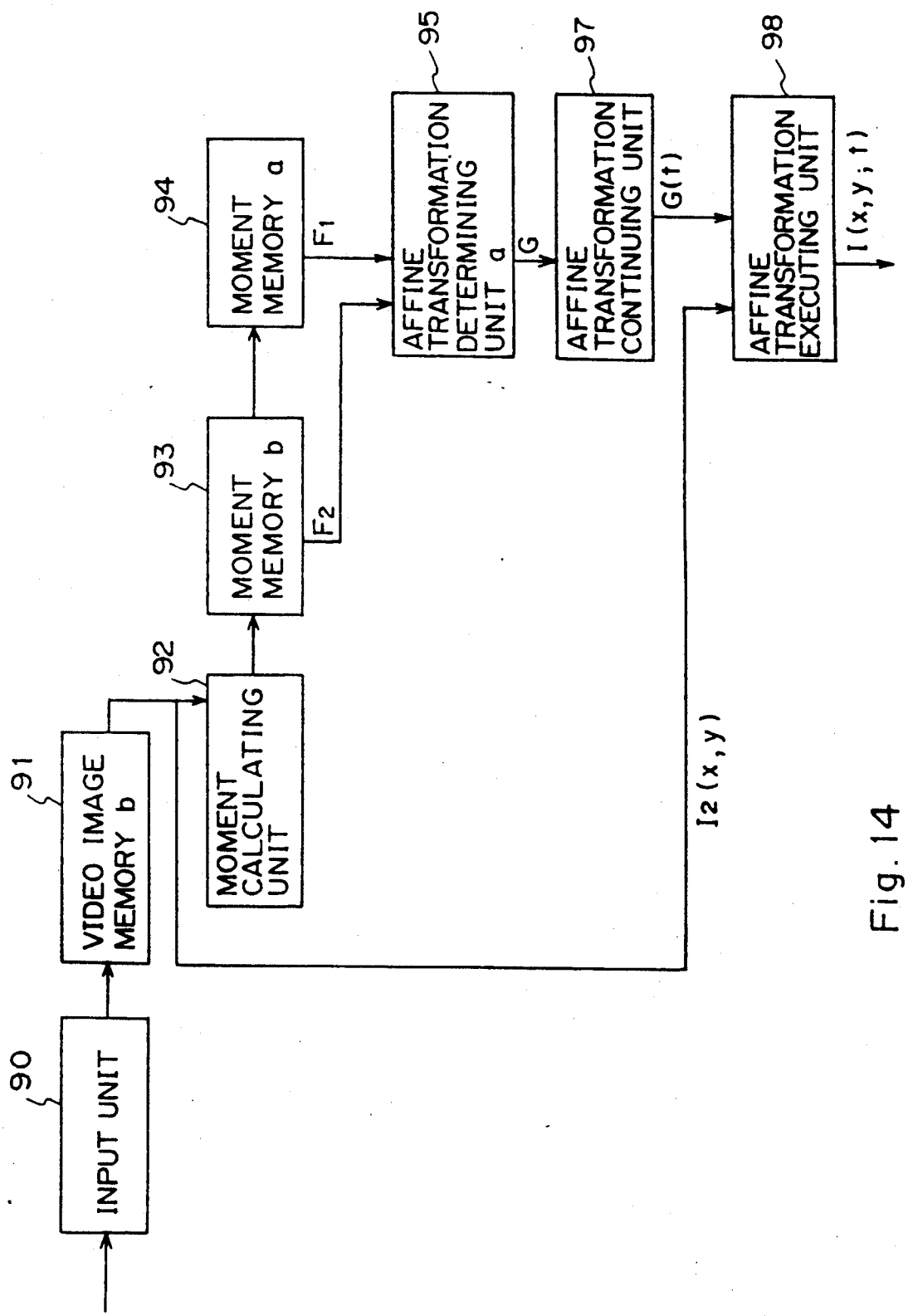
FIG. 14 shows a block diagram of an arrangement of the third embodiment of the moving video image data estimation system.

FIG. 14 shows the system structure of a third embodiment of the present invention. The embodiment shown in FIG. 14 simplifies the embodiment shown in FIG. 13. Equation (28) can be transformed to the equation (28)' by using the following equations (29) and (30).

$$\begin{aligned}
G(t_1)G(t_2) &= G(t_1 + t_2) & (29)\\
G^{-1}(t) &= G(-t) & (30)\\
I(x, y; t) &= G(t) G^{-1} * I_2(x, y) & (28)'\\
&= G(t)G(-1) * I_2(x, y) &\\
&= G(t - 1) \times I_2(x, y) & (14)\\
I(x, y; t) &= G(t)G^{-1} * I_2(x, y) & (11)\\
&= G(t)G(-1) * I_2(x, y) &\\
&= G(t - 1) * I_2(x, y) & (31)
\end{aligned}$$

Equation (31) for predicting a video image at an arbitrary time t of t>1 can be obtained.

FIG. 14 shows the structure of a system for predicting a video image by using the equation (31).

The embodiment shown in FIG. 14 comprises input unit 90, video image memory b91, moment calculating unit 92, moment memory a94, moment memory b93, affine transformation determining unit a95 and affine transformation continuing unit 97, as in the embodiment shown in FIG. 13. Thus, it performs an operation similar to that of the embodiment of FIG. 13. Affine transformation executing unit 98 shown in FIG. 14 is different from that in the embodiment of FIG. 13 in that it executes the image prediction process in accordance with equation (31).

The embodiment shown in FIG. 14 performs the same operation as in the embodiment shown in FIG. 13 until respective moment characteristics $F_1$ and $F_2$ of the first frame video image and the second frame video image are calculated. The first frame video image is first received by input unit 90 and converted to video image data $I_1(x,y)$. It is then stored in video image memory b91. Video image data $I_1(x,y)$ stored in video image memory b91 is then transmitted to moment calculating unit 92, which calculates the moment characteristic $F_1(X_1, Y_1, \theta_1, \kappa_1, \lambda_1)$ of the first frame video image and stores it in the moment memory b93.

Next, input unit 90 receives the second frame video image, and converts it into video image data $I_2(x,y)$, and stored in video image memory b91. At this time, the first frame video data $I_1(x,y)$ stored in video image memory b91 is disposed of. Video image data $I_2(x,y)$ stored in video image memory b91 is then transmitted to moment calculating unit 92 and moment calculating unit 92 calculates the moment characteristic $F_2(X_2, Y_2, \theta_2, \kappa_2, \lambda_2,)$ of the second frame video image and stores it in moment memory b93. At this time, the moment characteristic $F_1$ of the first frame video image stored in moment memory b93 at the time is transmitted to moment memory a94 and is stored therein.

When respective moment characteristics $F_1$ and $F_2$ are stored in moment memories a, b (94 and 93), then affine transformation determining unit a95 is activated. Affine transformation determining unit a95 receives moment characteristics $F_1$ and $F_2$ and obtains affine transformation G to convert moment characteristic F1 to moment characteristic $F_2$. Affine transformation G calculated by affine transformation determining unit a95 is transmitted to affine transformation continuing unit 97 and affine transformation continuing unit 97 obtains affine transformation G(t), which is continuous with time. This process can be achieved by using equation (6) as in the first embodiment.

Finally, affine transformation executing unit 98 predicts the video image at an arbitrary time t after time n (t>1). Affine transformation executing unit 98 receives affine transformation G(t), which is obtained by affine transformation continuing unit 97 and is continuous with time, and the second frame video image data $I_2(x,y)$. It thereby predicts a video image $I(x,y;t)$ at an arbitrary time t(t>1) after the second frame of the video image, in accordance with equation (31).

At described in detail above, according to the present invention, a video image at an arbitrary time t between a time n and a time n+1 is estimated as one portion of the sequential change of the image at time n to the video image at time n+1 so that the video image at time t can be alternatively produced. Further, it becomes possible to estimate a video image at an arbitrary time t after time n+1 by using a video image at time n and a video image at time n+1. Therefore, the present invention can be applied to a wide variety of systems utilizing real moving pictures, such as television, animation, medical treatment industries and so on.

Having described preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A moving video image estimation system comprising:

moment calculating means for calculating primary and secondary moments of a video image;

affine transformation calculating means utilizing an output of said moment calculating means to determine affine transformation (G) by which a first frame video image ($I_1$) is geometrically transformed into a second frame video image ($I_2$);

affine transformation continuing means for multiplying by a constant (t) an infinitesimal transformation (A), given by the relation G=exp(A), and obtaining an exponential transformation $\{exp(At)\}$ as a continued affine transformation; and affine transformation executing means for performing said continued affine transformation $\{exp(At)\}$ to thereby obtain a video image of a time after an arbitrary time (t) from a time corresponding to said first frame video image.

2. The moving video image estimation system according to claim 1, wherein said affine transformation executing means executes said continued affine transformation $\{exp(At)\}$ on the first frame video image ($I_1$) to thereby obtain a video image occurring after an arbitrary time (t) from a time corresponding to said first frame video image.

3. The moving video image estimation system according to claim 1, wherein moments of said first and second frame video images are calculated to extract characteristics of respective video images, the affine transformation for coupling the characteristics of said first and second frame video images is determined, the exponential transformation $\{exp(At)\}$ is obtained as the continued affine transformation after the infinitesimal transformation (A) of said affine transformation (G) is multiplied by the constant (t) and said continued affine transformation $\{exp(At)\}$ is executed on said first frame video image ($I_1$) to thereby assume a video image at the arbitrary time (t).

4. The moving video image estimation system according to claim 1, wherein said affine transformation calculating means calculates an inverse transformation ($G^{-1}$) of said affine transformation (G) and said affine transformation executing means executes a transformation of the product $\{exp(At)\}G^{-1}$ of said continued affine transformation and said inverse transformation on said second frame video image ($I_2$) to thereby obtain a video image after said second frame video image.

5. The moving video image estimation system according to claim 4, wherein said moment calculating means comprises an input portion for receiving video image data, a video image memory for first storing said first frame video image and finally storing said second frame video image, a first moment memory for storing a moment of said first frame video image and a second moment memory for storing a moment of said second frame video memory; and said affine transformation calculating means comprises a first affine transformation determining unit for determining said affine transformation (G) and a second affine transformation determining unit for calculating the inverse transformation ($G^{-1}$) of said affine transformation.

6. The moving video image estimation system according to claim 1, wherein said affine transformation executing means executes a transformation {exp(A (t-1))} on said second frame video image ($I_2$) by using said continued affine transformation {exp(At)} to thereby obtain a video image after said second frame video image.

7. The moving video image estimation system according to claim 6, wherein said moment calculating means comprises an input portion for receiving video image data, a video image memory for first storing said first frame video image and finally storing said second frame video image, a first moment memory for storing a moment of said first frame video image and a second moment memory for storing a moment of said second frame video memory; and
  said affine transformation calculating means comprises an affine transformation determining unit for determining said affine transformation (G).

8. An moving video image estimation system comprising:
  moment calculating means for calculating primary and secondary moments of a video image;
  affine transformation calculating means utilizing an output of said moment calculating means for determining an affine transformation (G) by which a first frame video image ($I_1$) is geometrically transformed into a second frame video image ($I_2$);
  first affine transformation continuing means for multiplying by a constant (t) and infinitesimal transformation (A), given by the relation of G=exp(A) with respect to said affine transformation (G) and for obtaining and exponential transformation {exp(At)};
  second affine transformation continuing means for multiplying said infinitesimal transformation (A) by another constant (t−1) and obtaining an exponential transformation {exp(A(t−1))}; and
  affine transformation executing means for obtaining a video image at an arbitrary time (t) between said first and second frames as a linear sum of results which is provided by executing a transformation {exp(At)}, provided as an output of said first affine transformation continuing means, onto said first frame video image ($I_1$) and of a result which is provided by executing a transformation {exp-(A(t−1))}, provided as an output of said second affine transformation continuing means, onto said second frame video image ($I_2$).

9. The moving video image estimation system according to claim 8, wherein
  an input unit is provided for inputting video image data,
  a first video image memory is provided for storing video image data of said first frame,
  a second video image memory is provided for storing video image data of said second frame,
  a first moment memory is provided for storing a moment of said first frame video image,
  a second moment memory is provided for storing a moment of said second frame video image,
  a first affine transformation unit is provided for performing a continued affine transformation output from said first affine transformation continuing unit onto the first frame video image stored in said first video image memory,
  a second affine transformation unit is provided for performing a continued affine transformation output from said second affine transformation continuing unit onto the second frame video image stored in said second video image memory and
  a video image synthesizing unit is provided for calculating a linear sum of outputs of said first and second affine transformation units to thereby obtain a video image at an arbitrary time, wherein said system includes an affine transformation executing unit equivalent to said affine transformation executing means.

10. The moving video image estimation system according to claim 9, wherein
  said input unit comprises a television camera for picking up a video image and an analog-to-digital converter for converting an output of said television camera into a digital signal,
  said moment calculating unit comprises of a video image projection circuit for obtaining projections to the x axis, the y axis and the oblique axis of video image; three projection memories for storing projections of the x axis, the y axis and the oblique axis output from said video image projection circuit; and a moment calculating circuit for calculating a moment of a video image by utilizing outputs of said three projection memories,
  said affine transformation calculating unit and said first and second affine transformation continuing units are formed of one portion of a microprocessor,
  said first affine transformation unit is composed of a first affine transformation coefficient memory and a first affine circuit,
  said second affine transformation unit is composed of a second affine transformation coefficient memory and a second affine transformation circuit and
  said video image synthesizing unit is a video image synthesizing circuit.

11. The moving video image estimation system according to claim 9, wherein said moment calculating unit calculates projections of the x axis, the y axis and the oblique axis; zero-order moment $m_0$; primary moments $m_X$ and $m_Y$; coordinates X and Y of gravity of a video image; secondary moments $m_{XX}$, $m_{YY}$ and $m_{XY}$; and central moments $M_{XX}$, $M_{YY}$ and $M_{XY}$.

12. The moving video image estimation system according to claim 9, wherein said affine transformation calculating unit utilizes coordinates of centroid X and Y and central moments $M_{XX}$, $M_{YY}$ and $M_{XY}$ of said first and second frame video images output from said moment calculating unit to calculate a direction $\theta$ of the principal axis of inertia of each video image, a moment $\kappa$ about the axis perpendicular to said principal axis of inertia and a moment $\lambda$ about said principal axis of inertia, thereby obtaining matrix element $L_{ij}$ and vector element $B_i$ of matrix $$\begin{bmatrix} x' \\ y' \end{bmatrix} = \begin{bmatrix} L_{11} & L_{12} \\ L_{21} & L_{22} \end{bmatrix} \begin{bmatrix} x \\ y \end{bmatrix} + \begin{bmatrix} B_1 \\ B_2 \end{bmatrix}$$

which transforms a coordinate (x, y) into a coordinate (x′, y′) as an affine transformation coefficient.

13. The moving video image estimation system according to claim 9, wherein
said first affine transformation continuing unit determines the time t,
a matrix element hij is calculated in order to calculate the matrix element lij(t) of affine transformation,
the matrix element lij (t) of affine transformation is calculated by the matrix element hij,
a matrix element Pij is calculated in order to calculate a vector element bi(t) of affine transformation and the vector element bi(t) of affine transformation is calculated by using said element Pij.

14. The moving video image estimation system according to claim 9, wherein
said second affine transformation continuing unit determines the time t,
t−1 is substituted for t,
the matrix element hij is calculated in order to calculate a matrix element lij'(t) of affine transformation,
the matrix element lij'(t) of affine transformation is calculated by using said element hij,
a matrix element Pij is calculated in order to calculate a vector element bi'(t) of affine transformation and the vector element bi'(t) of affine transformation is calculated by using said element Pij.

15. The moving video image estimation system according to claim 9, wherein
said first affine transformation continuing unit determines the time t,
the matrix element hij is calculated in order to calculate the matrix element lij(t) of affine transformation,
the matrix element lij(t) of affine transformation is calculated by using said matrix element hij,
the matrix element Pij is calculated in order to calculated the vector element bi(t) of affine transformation,
the vector element bi(t) of affine transformation is calculated by using said element Pij,
said second affine transformation continuing unit determines the time t,
t−1 is substituted for t,
the matrix element hij is calculated in order to calculate the matrix element lij'(t) of affine transformation,
the matrix element lij'(t) of affine transformation is calculated by using said element hij,
the matrix element Pij is calculated in order to calculate the vector element bi'(t) of affine transformation,
the vector element bi'(t) of affine transformation is calculated by using said element Pij,
said affine transformation executing unit executes the affine transformation on said first frame video image by using the elements lij(t) and bi(t) calculated by said first affine transformation continuing unit,
said affine transformation executing unit executes affine transformation on said second frame video image by using the elements lij'(t) and bi'(t) calculated by said second affine transformation continuing unit, and
executed results of said two affine transformations are synthesized to obtain an interpolated video image.

* * * * *